(12) United States Patent
Williamson

(10) Patent No.: US 7,151,968 B2
(45) Date of Patent: Dec. 19, 2006

(54) INTELLIGENT COFFEEMAKER APPLIANCE

(75) Inventor: Charles G. Williamson, Columbia, MO (US)

(73) Assignee: Salton, Inc., Lake Forest, IL (US)

( * ) Notice: Subject to any disclaimer, the term of this patent is extended or adjusted under 35 U.S.C. 154(b) by 447 days.

(21) Appl. No.: 10/001,261

(22) Filed: Nov. 1, 2001

(65) Prior Publication Data
US 2003/0079613 A1  May 1, 2003

(51) Int. Cl.
G05B 19/18 (2006.01)
G05B 15/00 (2006.01)
A23G 3/00 (2006.01)
G08B 1/08 (2006.01)

(52) U.S. Cl. .................. 700/65; 700/83; 99/323.3; 340/538

(58) Field of Classification Search .............. 700/83, 700/65, 12, 15; 340/534, 538; 99/323.3
See application file for complete search history.

(56) References Cited

U.S. PATENT DOCUMENTS

| | | | |
|---|---|---|---|
| 3,334,340 A | 8/1967 | McConnell | |
| 3,659,280 A | 4/1972 | Donohoo | |
| 3,689,886 A | 9/1972 | Durkee | |
| 3,710,373 A | 1/1973 | Watanabe et al. | |
| 3,810,096 A | 5/1974 | Kabat et al. | |
| 3,818,481 A | 6/1974 | Dorfman et al. | |
| 3,876,984 A | 4/1975 | Chertok | |
| 3,895,370 A | 7/1975 | Valentini | |
| 3,909,821 A | 9/1975 | Jagoda et al. | |
| 3,911,415 A | 10/1975 | Whyte | |
| 3,938,129 A | 2/1976 | Smither | |
| 3,942,168 A | 3/1976 | Whyte | |
| 3,942,170 A | 3/1976 | Whyte | |
| 3,944,723 A | 3/1976 | Fong | |
| 3,967,264 A | 6/1976 | Whyte et al. | |
| 3,973,240 A | 8/1976 | Fong | |
| 3,980,954 A | 9/1976 | Whyte | |
| 4,008,467 A | 2/1977 | Pattantyus-Abraham et al. | |
| 4,016,429 A | 4/1977 | Vercellotti et al. | |
| 4,017,845 A | 4/1977 | Kilian et al. | |
| 4,065,763 A | 12/1977 | Whyte et al. | |
| 4,200,862 A | 4/1980 | Campbell et al. | |
| 4,307,380 A | 12/1981 | Gander | |
| 4,321,851 A | 3/1982 | Adachi | |
| 4,328,482 A | 5/1982 | Belcher et al. | |
| 4,348,582 A | 9/1982 | Budek | |
| 4,355,303 A | 10/1982 | Phillips et al. | |
| 4,371,867 A | 2/1983 | Gander | |
| 4,377,804 A | 3/1983 | Suzuki | |
| 4,379,284 A | 4/1983 | Boykin | |
| 4,392,121 A | 7/1983 | Gray et al. | |
| 4,398,178 A | 8/1983 | Russ et al. | |
| 4,400,688 A | 8/1983 | Johnston et al. | |

(Continued)

FOREIGN PATENT DOCUMENTS

JP         2000357146 A   * 12/2000

*Primary Examiner*—Thomas Pham
(74) *Attorney, Agent, or Firm*—Sonnenschein Nath & Rosenthal LLP

(57) ABSTRACT

The invention may be broadly conceptualized as an approach in which a coffeemaker (116) receives a plurality of timer settings from a network and communicates the state of the coffeemaker (116) to another network device while keeping a real-time clock (1112) synchronized and correctly set by receiving period time synchronization messages.

29 Claims, 15 Drawing Sheets

U.S. PATENT DOCUMENTS

| | | |
|---|---|---|
| 4,408,186 A | 10/1983 | Howell |
| 4,418,333 A | 11/1983 | Schwarzbach et al. |
| 4,419,758 A | 12/1983 | Dorey |
| 4,433,326 A | 2/1984 | Howell |
| 4,471,399 A | 9/1984 | Udren |
| 4,479,215 A | 10/1984 | Baker |
| 4,528,667 A | 7/1985 | Frühauf |
| 4,538,136 A | 8/1985 | Drabing |
| 4,540,890 A | 9/1985 | Gangemi et al. |
| 4,556,864 A | 12/1985 | Roy |
| 4,556,865 A | 12/1985 | Fukagawa et al. |
| 4,556,866 A | 12/1985 | Gorecki |
| 4,563,650 A | 1/1986 | York et al. |
| 4,599,598 A | 7/1986 | Komoda et al. |
| 4,602,240 A | 7/1986 | Perkins et al. |
| 4,611,274 A | 9/1986 | Machino et al. |
| 4,628,440 A | 12/1986 | Thompson |
| 4,633,218 A | 12/1986 | Palsgrove et al. |
| 4,636,771 A | 1/1987 | Ochs |
| 4,638,299 A | 1/1987 | Campbell |
| 4,642,607 A | 2/1987 | Strom et al. |
| 4,642,637 A | 2/1987 | Baer |
| 4,644,320 A | 2/1987 | Carr et al. |
| 4,654,630 A | 3/1987 | Adame |
| 4,675,579 A | 6/1987 | Hardy et al. |
| 4,675,668 A | 6/1987 | Ise et al. |
| 4,686,356 A | 8/1987 | Ueda et al. |
| 4,703,306 A | 10/1987 | Barritt |
| 4,716,409 A | 12/1987 | Hart et al. |
| 4,745,391 A | 5/1988 | Gajjar |
| 4,745,392 A | 5/1988 | Ise et al. |
| 4,746,809 A | 5/1988 | Coleman et al. |
| 4,746,897 A | 5/1988 | Shuey |
| 4,772,870 A | 9/1988 | Reyes |
| 4,780,588 A | 10/1988 | Edamura |
| 4,782,322 A | 11/1988 | Lechner et al. |
| 4,785,195 A | 11/1988 | Rochelle et al. |
| 4,788,527 A | 11/1988 | Johansson |
| 4,815,106 A | 3/1989 | Propp et al. |
| 4,835,517 A | 5/1989 | van der Gracht et al. |
| 4,885,563 A | 12/1989 | Johnson et al. |
| 4,890,089 A | 12/1989 | Shuey |
| 4,903,006 A | 2/1990 | Boomgaard |
| 4,952,905 A | 8/1990 | Oliver |
| 4,972,060 A | 11/1990 | Edamura |
| 4,980,540 A * | 12/1990 | Vancha ..................... 219/492 |
| 5,032,435 A | 7/1991 | Biefeld et al. |
| 5,043,860 A | 8/1991 | Koether et al. |
| 5,086,385 A | 2/1992 | Launey et al. |
| 5,185,591 A | 2/1993 | Shuey |
| 5,198,642 A | 3/1993 | Deniger |
| 5,235,167 A | 8/1993 | Dvorkis et al. |
| 5,241,283 A | 8/1993 | Sutterlin |
| 5,257,006 A | 10/1993 | Graham et al. |
| 5,264,823 A | 11/1993 | Stevens |
| 5,268,666 A | 12/1993 | Michel et al. |
| 5,272,300 A | 12/1993 | Edamura |
| 5,274,209 A | 12/1993 | Edamura |
| 5,321,232 A | 6/1994 | Ogle |
| 5,352,957 A | 10/1994 | Werner |
| 5,375,508 A | 12/1994 | Knepler et al. |
| 5,410,292 A | 4/1995 | Le Van Suu |
| 5,410,949 A | 5/1995 | Yung |
| 5,426,286 A | 6/1995 | Nair et al. |
| 5,452,344 A | 9/1995 | Larson |
| 5,463,932 A * | 11/1995 | Olson ......................... 99/280 |
| 5,472,347 A | 12/1995 | Nordenstrom et al. |
| 5,485,040 A | 1/1996 | Sutterlin |
| 5,491,463 A | 2/1996 | Sargeant et al. |
| 5,504,311 A | 4/1996 | DuBuis et al. |
| 5,521,445 A * | 5/1996 | Letorey et al. ............. 307/139 |
| 5,537,104 A * | 7/1996 | Van Dort et al. ....... 340/825.52 |
| 5,570,085 A | 10/1996 | Bertsch |
| 5,573,691 A | 11/1996 | Yoshida et al. |
| 5,600,119 A | 2/1997 | Dvorkis et al. |
| 5,621,662 A | 4/1997 | Humphries et al. |
| 5,634,101 A | 5/1997 | Blau |
| 5,691,691 A | 11/1997 | Merwin et al. |
| 5,694,108 A | 12/1997 | Shuey |
| 5,694,115 A | 12/1997 | Desatoff |
| 5,704,029 A | 12/1997 | Wright, Jr. |
| 5,706,191 A | 1/1998 | Bassett et al. |
| 5,710,409 A | 1/1998 | Schwarzbäcker et al. |
| 5,717,923 A | 2/1998 | Dedrick |
| 5,721,832 A | 2/1998 | Westrope et al. |
| 5,756,981 A | 5/1998 | Roustaei et al. |
| 5,777,545 A | 7/1998 | Patel et al. |
| 5,801,940 A | 9/1998 | Russ et al. |
| 5,812,642 A | 9/1998 | Leroy |
| 5,815,086 A | 9/1998 | Ivie et al. |
| 5,818,428 A | 10/1998 | Eisenbrandt et al. |
| 5,838,226 A | 11/1998 | Houggy et al. |
| 5,839,097 A | 11/1998 | Klausner |
| 5,844,949 A | 12/1998 | Hershey et al. |
| 5,845,074 A | 12/1998 | Kobata |
| 5,848,028 A * | 12/1998 | Burklin ........................ 368/46 |
| 5,862,325 A | 1/1999 | Reed et al. |
| 5,869,819 A | 2/1999 | Knowles et al. |
| 5,875,430 A | 2/1999 | Koether |
| 5,877,957 A * | 3/1999 | Bennett ........................ 700/86 |
| 5,901,634 A | 5/1999 | Vancamp et al. |
| 5,907,144 A | 5/1999 | Poon et al. |
| 5,913,204 A | 6/1999 | Kelly |
| 5,913,210 A | 6/1999 | Call |
| 5,929,748 A | 7/1999 | Odinak |
| 5,929,749 A | 7/1999 | Slonim et al. |
| 5,933,073 A | 8/1999 | Shuey |
| 5,938,757 A | 8/1999 | Bertsch |
| 5,938,966 A | 8/1999 | Oh et al. |
| 5,956,487 A | 9/1999 | Venkatraman et al. |
| 5,970,467 A | 10/1999 | Alavi |
| 5,971,277 A | 10/1999 | Cragun et al. |
| 5,977,865 A | 11/1999 | Odinak et al. |
| 5,978,773 A | 11/1999 | Hudetz et al. |
| 5,994,677 A | 11/1999 | Åkerlind |
| 6,005,477 A | 12/1999 | Deck et al. |
| 6,012,102 A | 1/2000 | Shachar |
| 6,040,565 A | 3/2000 | Åkerlind |
| 6,047,049 A | 4/2000 | Yoo |
| 6,064,978 A | 5/2000 | Gardner et al. |
| 6,065,047 A | 5/2000 | Carpenter et al. |
| 6,070,145 A | 5/2000 | Pinsley et al. |
| 6,073,266 A | 6/2000 | Ahmed et al. |
| 6,082,776 A | 7/2000 | Feinberg |
| 6,088,717 A | 7/2000 | Reed et al. |
| 6,091,320 A | 7/2000 | Odinak |
| 6,092,053 A | 7/2000 | Boesch et al. |
| 6,095,031 A | 8/2000 | Warne |
| 6,100,509 A | 8/2000 | Saito |
| 6,112,246 A | 8/2000 | Horbal et al. |
| 6,118,974 A | 9/2000 | Holliday, III et al. |
| 6,121,593 A | 9/2000 | Mansbery et al. |
| 6,124,583 A | 9/2000 | Bowers |
| 6,128,652 A | 10/2000 | Toh et al. |
| 6,134,548 A | 10/2000 | Gottsman et al. |
| 6,137,095 A | 10/2000 | Kashimoto et al. |
| 6,137,805 A | 10/2000 | Berstis |
| 6,138,150 A | 10/2000 | Nichols et al. |
| 6,140,621 A | 10/2000 | Ho et al. |
| 6,144,291 A | 11/2000 | Odinak et al. |
| 6,144,292 A | 11/2000 | Brown |
| 6,151,480 A | 11/2000 | Fischer et al. |
| 6,151,631 A | 11/2000 | Ansell et al. |
| 6,151,634 A | 11/2000 | Glaser et al. |

| | | | | | |
|---|---|---|---|---|---|
| 6,154,738 A | 11/2000 | Call | 6,243,772 B1 | 6/2001 | Ghori et al. |
| 6,157,935 A | 12/2000 | Tran et al. | 6,246,672 B1 | 6/2001 | Lumelsky |
| 6,169,789 B1 | 1/2001 | Rao et al. | 6,249,213 B1 | 6/2001 | Horne |
| 6,169,879 B1 | 1/2001 | Perlman | 6,252,206 B1 | 6/2001 | Leukhardt, III et al. |
| 6,170,007 B1 | 1/2001 | Venkatraman et al. | 6,253,061 B1 | 6/2001 | Helferich |
| 6,170,746 B1 | 1/2001 | Brook et al. | 6,253,228 B1 | 6/2001 | Ferris et al. |
| 6,175,826 B1 | 1/2001 | Malandra, Jr. et al. | 6,253,239 B1 | 6/2001 | Shklar et al. |
| 6,180,934 B1 | 1/2001 | Ishizaki et al. | 6,260,076 B1 | 7/2001 | Savitzky et al. |
| 6,181,324 B1 | 1/2001 | Lamb et al. | 6,269,397 B1 | 7/2001 | Pirhonen |
| 6,189,029 B1 | 2/2001 | Fuerst | 6,272,532 B1 | 8/2001 | Feinleib |
| 6,217,924 B1 | 4/2001 | Sit et al. | 6,275,851 B1 | 8/2001 | Cromer et al. |
| 6,218,931 B1 | 4/2001 | Asghar et al. | 6,275,922 B1 | 8/2001 | Bertsch |
| 6,222,853 B1 | 4/2001 | Marttinen et al. | 6,277,449 B1 | 8/2001 | Kolluri et al. |
| 6,225,997 B1 | 5/2001 | Mitsuoka et al. | 6,278,357 B1 | 8/2001 | Croushore et al. |
| 6,229,432 B1 | 5/2001 | Fridley et al. | 6,281,784 B1 | 8/2001 | Redgate et al. |
| 6,233,564 B1 | 5/2001 | Schulze, Jr. | 6,282,656 B1 | 8/2001 | Wang |
| 6,233,609 B1 | 5/2001 | Mittal | 6,282,714 B1 | 8/2001 | Ghori et al. |
| 6,236,990 B1 | 5/2001 | Geller et al. | 6,587,739 B1 * | 7/2003 | Abrams et al. ............... 700/83 |
| 6,236,991 B1 | 5/2001 | Frauenhofer et al. | | | |
| 6,240,442 B1 | 5/2001 | Domenikos et al. | * cited by examiner | | |

Please select radio presets from the list below. You may set a maximum of

| Available FM Stations | | | | Selected Stations | Current | |
|---|---|---|---|---|---|---|
| Freq | Call Sign | City | State | | ## | Call Sig |
| 88.1 | KDHX | ST. LOUIS | MO | ☑ ~416 | 01 | KMJM- |
| 89.1 | KCLC | ST. CHARLES | MO | ☑ | 02 | KDHX |
| | | | | | 03 | KCLC |
| 89.5 | KNLH | CEDAR HILL | MO | ☑ | 04 | KNLH |
| 89.7 | KYMC | BALLWIN | MO | ☑ | 05 | KYMC |
| | | | | | 06 | WRY |
| 89.9 | KGNA-FM | ARNOLD | MO | ☑ | 07 | KGNA- |
| 90.7 | KWMU | ST. LOUIS | MO | ☑ | 08 | KWMI |
| | | | | | 09 | KSIV-F |
| 91.5 | KSIV-FM | ST. LOUIS | MO | ☑ | 10 | KFMO |
| 92.3 | WIL-FM | ST. LOUIS | MO | ☐ | 11 | KSHE |
| | | | | | 12 | KIHT |
| 93.3 | KNSX | STEELVILLE | MO | ☐ | 13 | KFTK |
| 93.7 | KSD | ST. LOUIS | MO | ☐ | 14 | KHCR |
| | | | | | 15 | KSIV |
| 94.7 | KSHE | CRESTWOOD | MO | ☑ | 16 | KFUO-F |

Fig. 4

Please set alarm schedule for each day of the week.

| Day (502) | Set Schedule On Time (504) | | | Web Wake-up Station (506) | Active | Current (508) Day | On T |
|---|---|---|---|---|---|---|---|
| Sunday | 01 | 00 | am | No Station | ☐ | S | 01:00 |
| Monday | 07 | 05 | am | 01 KDHX-FM | ☑ | M | 07:05 |
| Tuesday | 07 | 30 | am | No Station | ☑ | T | 07:30 |
| Wednesday | 07 | 45 | am | No Station | ☑ | W | 07:30 |
| Thursday | 07 | 55 | am | 03 KNLH-FM | ☑ | T | 07:45 |
| Friday | 07 | 40 | am | 08 WMLL-AM | ☑ | F | 07:50 |
| Saturday | 01 | 00 | am | No Station | ☐ | S | 01:00 |

Update Alarm Schedule
Return to Program

Please select ultravection programs from the list below.
You may set a maximum of 20 Ultravection programs.

Search Results

| Name | UPC | Selected |
|---|---|---|
| Old El Paso Nachos | 89713578 | ☑ |
| Oscar Mayer Wieners | 23454872 | ☑ |
| Betty Crocker Brownies | 56372623 | ☐ |
| Sara Lee Chicken Cacciatore | 76236477 | ☐ |
| Kraft Macaroni and Cheese | 59834267 | ☑ |
| Ore Ida Cajun French Fries | 26835733 | ☐ |
| Old El Paso Nachos | 89713578 | ☑ |
| Oscar Mayer Wieners | 23454872 | ☑ |
| Betty Crocker Brownies | 56372623 | ☐ |
| Sara Lee Chicken Cacciatore | 76236477 | ☐ |
| Old El Paso Nachos | 89713578 | ☑ |
| Oscar Mayer Wieners | 23454872 | ☑ |
| Betty Crocker Brownies | 56372623 | ☐ |
| Sara Lee Chicken Cacciatore | 76236477 | ☐ |
| Kraft Macaroni and Cheese | 59834267 | ☑ |
| Ore Ida Cajun French Fries | 26835733 | ☐ |

Please select microwave programs from the list below. You may set a maximum of 20 Microwave programs.

Search Results

| Name | UPC | Selected |
|---|---|---|
| Old El Paso Nachos | 89713578 | ☑ |
| Oscar Mayer Wieners | 23454872 | ☑ |
| Betty Crocker Brownies | 56372623 | ☐ |
| Sara Lee Chicken Cacciatore | 76236477 | ☐ |
| Kraft Macaroni and Cheese | 59834267 | ☑ |
| Ore Ida Cajun French Fries | 26835733 | ☐ |
| Old El Paso Nachos | 89713578 | ☑ |
| Oscar Mayer Wieners | 23454872 | ☑ |
| Betty Crocker Brownies | 56372623 | ☐ |
| Sara Lee Chicken Cacciatore | 76236477 | ☐ |
| Old El Paso Nachos | 89713578 | ☑ |
| Oscar Mayer Wieners | 23454872 | ☑ |
| Betty Crocker Brownies | 56372623 | ☐ |
| Sara Lee Chicken Cacciatore | 76236477 | ☐ |
| Kraft Macaroni and Cheese | 59834267 | ☑ |
| Ore Ida Cajun French Fries | 26835733 | ☐ |

Fig. 10

INTELLIGENT COFFEEMAKER APPLIANCE

BACKGROUND OF THE INVENTION

1. Technical Field

The invention relates to configuration of a kitchen or household appliance network. More particularly, the invention relates to an intelligent coffeemaker that is able to communicate with and receive information from another device in a network.

2. Related Art

Currently, household appliances such as coffeemakers and ovens are independent and when used require manual programming. Some appliances, such as a coffeemaker, may be configured to have timers for turning the appliance on and off. The programming of the timers in these appliances is accomplished at the appliance using manual controls or buttons. Further, it is often impossible to change the configuration or programming of an appliance, such as the auto off timer in a coffeemaker, once the appliance has left the factory.

Another problem with household appliances is for every product cooked, such as a frozen dinner, the user must set the cooking temperature and the time. Dinners may be ruined or homes burned down because of a user erroneously setting the wrong cooking time or temperature. Prior approaches to resolving the erroneous setting problem have included cookbooks that contain bar coded instructions associated with encoded instructions for setting cooking time and temperature. Such appliances include a bar code reader to read the cookbook's bar code associated with a user-selected recipe. However, as new products are introduced in the supermarket or new recipes are created, the cookbooks must be physically updated or replaced.

Furthermore, it is not uncommon for appliances to have clocks that must be initially set and reset after a power outage. Due to the quality of the components in an appliance clock, it is rare when all clocks on respective appliances match and do not drift apart. After some period of time, the clocks on some of the appliances will have to be adjusted if a user desires all clocks to report the same time. Furthermore, clocks have to be reset twice a year in the United States for changes to or from Day Light Savings Time and may also have to be reset following a power outage.

Thus, there is a needed in the art for an approach to set cooking time and temperature that is easy to updated while enabling coordination of data between multiple appliances.

SUMMARY

An intelligent controller having a modem communicates with a remote database that has a plurality of user profiles. A user profile in the database is configurable via a device for displaying a user interface, such as a personal computer accessing the World Wide Web with web pages for an intelligent controller and other appliances. The intelligent controller receives user profile information via the modem from the database. The user profile may include, for example alarm clock settings, radio stations, and recipe programs for the appliances. A power line communication unit in the intelligent controller allows communication of data received by the modem via an external network to other appliances over a local network communication link, such as the alternating current (AC) wiring of a home, a wireless connection, or the in home telephone wires.

A clock is periodically synchronized to a time message that the web server transmits to the intelligent controller and distributed by the power line communication unit to appliances that are capable of receiving the power line communications. The synchronization automatically corrects for time changes and assures all clocks report the correct time. The user profile also contains a time zone identifier that enables the clocks, including the clock in the intelligent controller, to report the proper time for a specified time zone. The intelligent controller may also have an associated radio with radio preset radio stations being programmed in the user profile and received at the intelligent controller via the modem. The radio along with the clock may function as an alarm clock radio having an alarm associated with each day of the week and each alarm being independently settable to a "buzz" or any of the programmed radio stations.

A coffeemaker having a local network communication link may be one of the networked appliances. The coffeemaker may receive time, brew time, warming time, and turn on/off time configuration information from the intelligent controller. The coffeemaker may also communicate its status to the intelligent controller allowing a user to know at a remote location if the coffeemaker needs to be set up for brewing, coffee is brewing or ready. Similarly, a breadmaker having a local network communication link, a display and bar code reader may be one of the networked appliances. The breadmaker is able to receive bread making recipe programs from the intelligent controller for storage in local memory. A user upon scanning or otherwise inputting a unique product code, such as a universal product code (UPC), provided with a package such as a bread mix or cake mix configures the cycles of the bread machine. A cycle typically includes a mixing period, dough rising period, baking period, and warming period.

A microwave oven and a non-microwave type oven (for example, gas oven, electric oven, convection oven, or Ultravection™ oven) may be among the associated other appliances within the network. Each such oven would have a local network communication link and receiving recipe information from the remote database via the intelligent controller. The recipe information is stored in their respective memories. Each oven may also have a bar code reader for reading UPCs that results in the microwave oven or heating element type oven being configured for cooking the scanned product. The user may also be guided via a display screen through the preparation of the product.

If the input unique product code is unknown (i.e. not present in the memory of the appliance), the appliance may communicate the product code to the intelligent controller. The intelligent controller could then transmit the product code to the remote database as an unidentified product code. Later, a recipe program associated with the "unknown" product code may be transmitted back to the intelligent controller for further transmission to the original reporting appliance. The original reporting appliance then saves the recipe in memory.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

FIG. 4 is a web page to select preset radio stations for the intelligent controller via the device capable of displaying a user interface of FIG. 2.

FIG. 5 is a web page to set alarms and radio station via the device capable of displaying a user interface of FIG. 2.

FIG. 8 is a web page to select oven recipe programs via the device capable of displaying a user interface of FIG. 2.

FIG. 9 is a web page to configure the coffeemaker settings via the device capable of displaying a user interface of FIG. 2.

FIG. 10 is a web page to select microwave recipe programs via the device capable of displaying a user interface of FIG. 2.

DETAILED DESCRIPTION OF THE EXEMPLARY EMBODIMENTS

Figure 1:
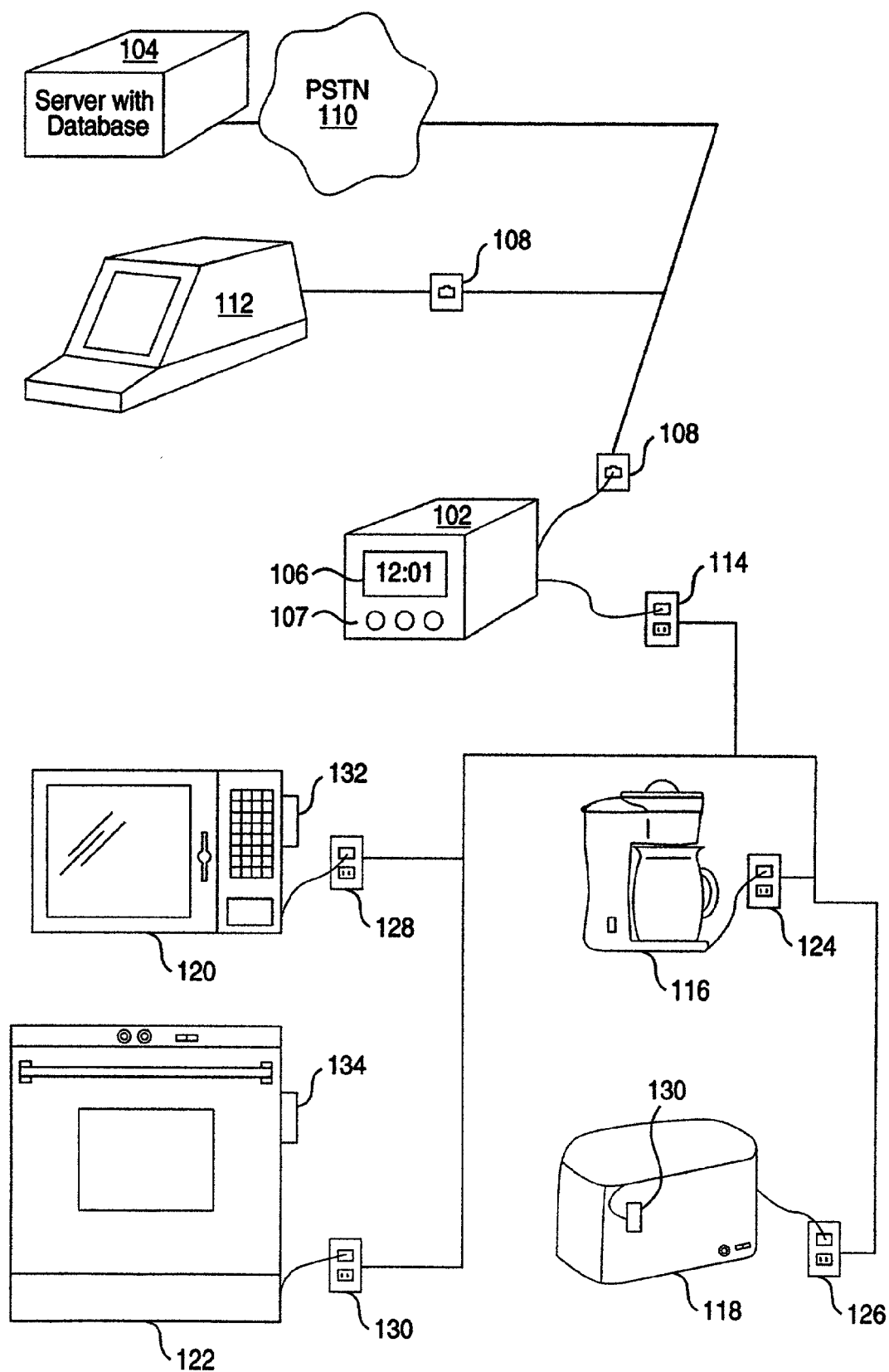
FIG. 1 is a diagram of an intelligent controller in communication with a device capable of displaying a user interface via a modem and other appliances via a local network communication link in accordance with an embodiment of the invention.

Reference is now made in detail to an embodiment of the present invention, an illustrative example of which is depicted in the accompanying drawings, showing an intelligent kitchen. In FIG. 1, a diagram of an intelligent controller 102 in communication with a web server 104 via a modem and other appliances by a power line communication unit is shown. In an alternate embodiment, radio frequency (RF) units may link the intelligent controller 102 and appliances 116–122 with a wireless link. In yet another embodiment, power line communication units provided a wired connection between the intelligent controller 102 and appliances 116–122 and RF units provide a second or redundant path between the intelligent controller 102 and appliances 116–122. In the alternate embodiments, the wired connection may be over CAT-3, CAT-5, or even fiber optical cables. The intelligent controller 102 may have a display 106 and control surfaces 107, such as push buttons and knobs.

The modem in the intelligent controller 102 is connected to a RJ-11 telephone jack 108. The intelligent controller 102 at periodic times uses the modem to initiate a data call through the PSTN 110 to a remote database 103. The remote database 103 contains data that is accessed by the server 104 and sent to the device capable displaying a user interface 112. An example of a remote database 103 is a database accessed by a web server upon a web page in a web browser either requesting or entering data. A device capable of displaying a user interface 112, such as a personal computer having another modem is also connected to via an RJ-11 telephone jack 114 and connected by PSTN 110 with server 104. The web device 112 communicates with the server 104 over an Internet Protocol connection. In an alternate embodiment, the intelligent controller 102 may connected through an internet service provider and may even use a cable modem or DSL router to connect with the internet. In yet another embodiment, a different communication protocol may be used by the device 112 to communicate with server 104.

The intelligent controller 102 is also connected to the alternating current (AC) home wiring by a power line communication unit communicating through a cord that is plugged into an AC outlet 114. The power line communication unit is able to communicate with other similarly equipped appliances such as coffeemaker 116, breadmaker 118, microwave oven 120, and conventional type oven 122. Each appliance 116–122 has an associated power line communication unit that communicates through an AC outlet 124–130 for two-way communication between the intelligent controller 102 and the appliances 116–122. Examples of power line communication units include X-10, CEBus and POWERBUS power line communication units.

The power line communications between the intelligent controller 102 and the appliances 116–122 may be used to synchronize of all of the appliance clocks with the internal clock of the intelligent controller 102. In turn, the intelligent controller 102 may have an internal clock that is periodically synchronized by communication with the remote database 103 located on server 104. In one embodiment, the remote database 103 maintains accurate time by receiving a timing signal from an atomic clock In an alternate embodiment, a GPS clock may provide an accurate time signal to the server 104. In another embodiment, a separate time server connected to an accurate clock or GPS clock may supply time to the network.

The coffeemaker 116 receives programming for when to turn on from over the power line via the intelligent controller 102. The coffeemaker 116 may periodically and/or randomly report its state to the intelligent controller 102, where it maybe displayed. If an "on" time is set, for instance, then the coffeemaker 116 may report to the intelligent controller that it is not ready to brew. Once the user places water and coffee grounds in the coffeemaker 116, the user presses a button on the coffeemaker 116 to place the coffeemaker 116 in a "ready to brew" state. Alternatively, coffeemaker 116 may have sensors to determine whether supply water and coffee grounds are available. The coffeemaker 116 having informed the intelligent controller 102 that the coffeemaker is in the "ready to brew" state then may display a ready to brew symbol in the display 110. When the programmed time occurs, the coffeemaker 116 starts to brew the coffee and may notify the intelligent controller 102 that it is in the brewing state. The intelligent controller 102 may, in turn, display a brewing symbol on its (optional) display.

When the coffeemaker finishes brewing, it may notify the intelligent controller 102 that the coffee is ready. The intelligent controller 102 then may display, a coffee is ready symbol. The coffeemaker turns off automatically after a predetermined time period. It may also be turned off manually by a user pushing an off button. In either event, the coffeemaker may inform the intelligent controller 102 of the state change The intelligent controller 102 may then report via its display that the coffeemaker is not ready to brew. Thus an advantage is achieved by having the intelligent controller 102 remotely display the state of the coffeemaker 116. Further, the time is correctly set and maintained by synchronization with the time maintained by the intelligent controller 102.

The breadmaker 118, microwave oven 120 and conventional oven 122 may each have a respective bar code reader 130–134. The bar code readers enables the user of appliances 118–122 to scan a unique product code, such as the universal product code (UPC) located on a food container. Alternatively, the appliances may be equipped with control surfaces, such as push buttons or switches, that allow a user to manually input the code. This may be used to make the appliances less expensive or where a bar code reader is broken or perhaps not purchased with the appliance. The appliances 118–122 then attempt to identify a recipe program associated with the input product code. If the recipe program is found in local memory, then the appliance is configured by the execution of the recipe program. Thus, an advantage is achieved by being able to configure the appliances 118–122 for different types and manufactures of consumer food products. Further the risk of incorrectly preparing the food products is reduced because of less human interaction during the cycle programming of the appliances 118–122.

Figure 2:
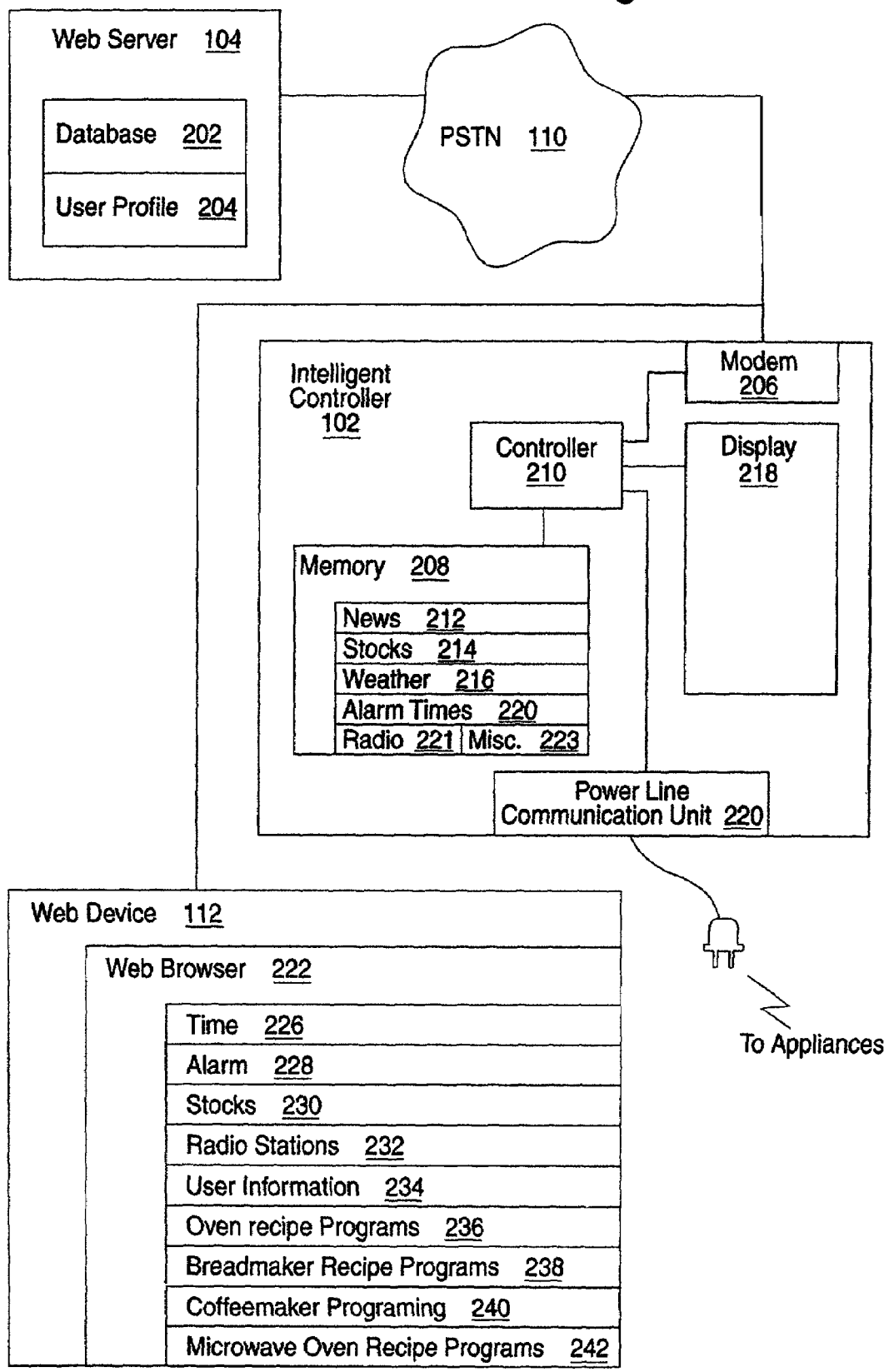
FIG. 2 is a diagram of the intelligent controller in communication with the web server and web device through a PSTN of FIG. 1.

Turning to FIG. 2, a diagram of the intelligent controller 102 in communication with the web server 104 and web device 112 through the PSTN 110 of FIG. 1 is shown. The web server 104 has a database 202 of user profiles with at least one user profile 204 associated with each intelligent controller. The user profile 204 is periodically pushed down to an associated intelligent controller 102 along with time synchronization data and updated user selected data, such as news 212, stock prices 214 and weather reports 216. In an alternate embodiment, time synchronization data and updated user selected data may be pulled down by the intelligent controller 102 from the web server 104. The user selected data is sent from the web server 104 through the PSTN 110 to be received via modem 206 at the intelligent controller 102. The controller 210 stores the user-selected data (news 212, stock prices 214 and weather reports 216) into memory 208. The user selected data stored in memory 208 may then be displayed by the controller 210 on display 218 along with time information.

The user profile 204 stored in the database 202 located on the web server 104 also contains configuration data, such as time zone, user-selected preset radio stations, alarm times and settings ("buzz" or a radio station). The alarm times 220 and radio stations 221 configuration data is stored by controller 210 in memory 208 when periodically pushed down to the intelligent controller 102 from the web server 104. Miscellaneous data, such as recipe program updates, new recipe programs, other text or programs may be received by the intelligent controller 210 and stored in memory 208 or as appropriate miscellaneous memory 223. Data stored in memory 208 may also be transmitted to and received from other appliances through a local network communication link 220.

The user profile 204 is configurable via a web browser 222 being executed on the web device 112 connected by an Internet Protocol connection through PSTN 110 to web server 104. In particular, the web browser 222 accesses configuration web pages 224 that may be associated with the intelligent controller 102 and other appliances 116–122. A time web page 226 is presented to a user of the web device 112 that allows a user to enter the zip code where the intelligent controller 102 will be located in operation. In other embodiments the time web page 226, may be implemented as input fields on another web page, such as a user information web page 234. The zip code is then used by a program on the web server 104 to identify possible radio stations and time zones. In other embodiments, the user may select the time zone and city where the intelligent controller 102 is located. Further, the time web page 226 may be used to configure the clock function, set alarm web page 228. Other web pages that may be configured include stock selection web page 230, program radio stations web page 232, user information web page 234, web pages for selections of recipe programs for a oven 236, breadmaker recipe program selection web page 238, coffeemaker programming web page 240, recipe program selection web page for the microwave oven 242 and recipe program selection pages for other appliances.

Each web page communicates with the web server 104 and may result in the user profile 204 in the database 202 being configured or updated. Changes in the user profile 204 are periodically transmitted between the intelligent controller 102 and the web server 104, preferably by pushing down the data (whole user profile or just the changes in the user profile), at predetermined intervals. Thus, the ability to change or update programs associated with the user profile is achieved by downloading the changes or updates to appliances 116–122 via the intelligent controller 102.

In an alternate embodiment, the web server 104 may contact the intelligent controller 102 and send the data contained in the user profile 204 to the intelligent controller 102 at periodic intervals. In yet another embodiment, the web server may contact the intelligent controller 102, upon configuration of the intelligent controller 102 and/or upon a change being made to the user profile 204. Similarly, in another alternate embodiment, the intelligent controller 102 may synchronize with the web server 104 and user profile 204 upon a predetermined action occurring. Examples of such actions include; a user physically pressing a button to cause synchronization, new appliances being detected on the power line, or receiving a "unknown unique product code" message from an appliance.

Intelligent Controller

Figure 3:
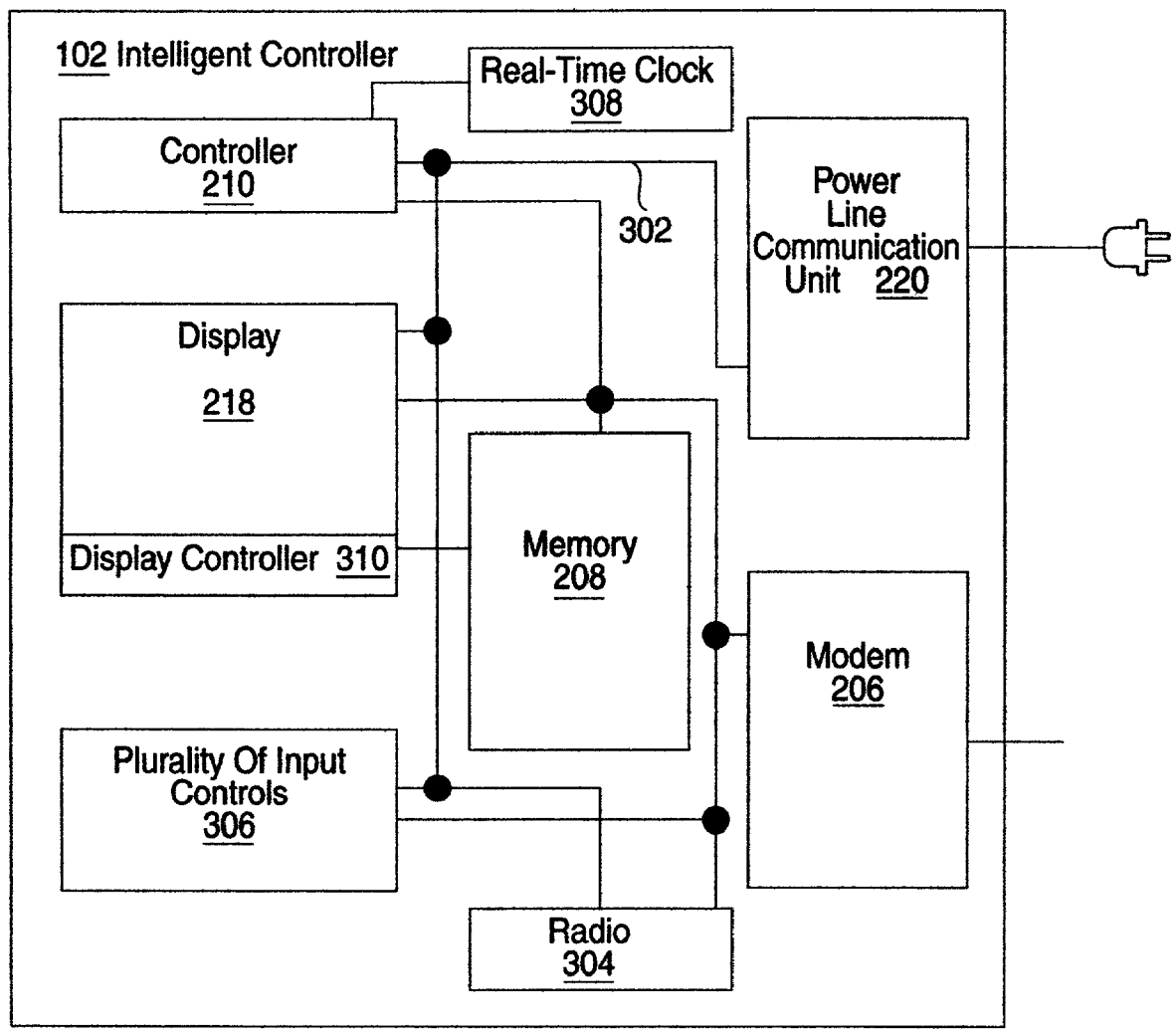
FIG. 3 is a block diagram of the intelligent controller of FIG. 2.

In FIG. 3, a block diagram of the intelligent controller 102 of FIG. 2 is shown The intelligent controller 102 has a controller 210 that is connected by a bus 302 to the modem 206, the memory 208, and the local network communication link 220 The intelligent controller 102 may also include the display 218, a radio 304, a plurality of input controls 306, and a real-time clock 308. The controller 210 is preferably a microprocessor, but in an alternate embodiment may be a reduced instruction set chip (RISC) processor, micro-controller, digital circuits functioning as a controller, analog circuits functioning as a controller, a combination of analog and digital circuits functioning as a controller, or a digital signal processor.

The modem 206 is preferably a low speed 300–14,400 kbps internal modem and is a network interface to PSTN 110. Among other potential advantages, the use of a low speed modem keeps the cost of the system lower. In an alternate embodiment, a higher speed modem or network interface may be used. In yet another alternate embodiment, an external network interface may be used to access the PSTN 110 and connect to the intelligent controller 102 via an external bus such as a serial bus, SCSI bus, or universal serial bus (USB). The modem 206 may also make a connection to the external network by wireless means, such as wireless Ethernet connection, 900 MHz in home network, or cellular connection.

The radio 304 is configurable by data received via the modem 206 by the controller 210. Such configuration information may include preset radio stations for among other available mediums both the AM and FM radio bands that are stored in memory 208. The radio 304 can be activated either by one of the plurality of input controls 306 or by the controller 210 in response to the real time clock 308. A radio signal is received by an antenna (not shown) among other available mediums such as streaming data. In an alternate embodiment, the radio 304 may included a weather alert radio in place of or in addition to the radio 304.

The display 218 is able to display text and low-resolution graphics. The display is controlled by a display controller 310 that is in communication with memory 208 and controller 210. Alternatively, display controller 310 may be integrated with controller 210 or display 218. The display 208 is a monochrome liquid crystal display (LCD). In an alternate embodiment, a high-resolution display may be used. Further, a color display may be used in yet another embodiment. In other embodiments, other types of displays that are capable of displaying data may be used, including for example cathode ray tubes and plasma displays. The display may even be a touch screen that combines the plurality of input controls 306 with display 218.

A real-time clock 308 having a oscillator is connected to the controller 210. The real-time clock 308 is a digital chip that is programmable by the controller 210 in response to a synchronization signal (time message) being received at modem 206. The real-time clock 308 is preferably only accurate enough to maintain time for a period of approximately two weeks, thus allowing for greater variances in component quality A network indicator may be provided on the display 218, to indicate if a synchronization of real-time clock 308 has occurred within a preceding two-week period. Thus, an advantage is achieved by maintaining the correct time by synchronization of the real-time clock 308 with the correct time maintained at the web server 104. Alternatively, a more accurate real time clock could be utilized, thus reducing the need for synchronization between the real-time clock 308 and the server 104.

The memory 208 is preferably a combination of random access memory (RAM), such as dynamic random access memory (DRAM), synchronous dynamic random access memory (SDRAM), or other types of read/write memory, and of read only memory (ROM), such as programmable read only memory (PROM), electrically erasable programmable read only memory (EEPROM). In an alternate embodiment, the memory may include external semi-permanent memory, such as magnetic disk (hard disk, removable hard disk, floppy disk), optical disk (CD-RW) or external permanent memory (CD-R and DVD-R). The memory 208 is divided into a program portion that controls the operation of the intelligent controller 102 and a data portion that maintains configuration data and variables used and manipulated by the controller 210 upon execution of a program.

The local network communication link 202 transmits a carrier signal that is capable of transporting data between the intelligent controller 102 and devices over a communication link. In a preferred embodiment, local network communication link 202 is a power line communication transceiver that sends and receives signals over a home's AC wiring that electrical appliances receive power. Thus, the power line communication unit is shown both a power supply for the intelligent controller 102 and a communication unit that enables two-way communication with other appliances that share the AC wiring, but may be implemented separately. Examples of such power line communication approaches include; X-10, CEBUS, and POWERBUS by Domosys Corp. In an alternate embodiment, the power line communication unit 202 may be replaced with a wireless RF unit that establishes a wireless connection between the intelligent controller 102 and other appliances.

The minimum functionality required in the intelligent controller 102 is to convert data received over an external network to the internal network enabling communication between the internal network and the external network. The communication path to the external network (e.g. Internet) is often costly to keep active and requires telephone resources that are only periodically available in a home. Therefore, the intelligent controller 102 acts as a temporary storage unit in the transmission of data. For example, if an appliance scans a product code that is unknown to that appliance, a message is sent to the intelligent controller 102 for future transmission to the web server 104 upon synchronization. Additional functionality is added to the intelligent controller 102 for the convenience of the user, such as the display 218, radio 304 and clock 308 with a human perceptible time indicator such as display 218, tones, synthesized voice, light emitting diodes forming a display).

Another slave intelligent controller (not shown) may be in communication with the intelligent controller 102 and act as a second input/display device. The slave intelligent controller has a controller, display, memory, power line communication unit, and plurality of control surfaces. In such a system, information displayed on the intelligent controller 102 is mirrored on the slave intelligent controller. The plurality of buttons 306 on intelligent controller 102 is also mirrored on the slave intelligent controller. Thus, a person may have one intelligent controller 102 and a plurality of slave intelligent controllers in different rooms of a home. Further, the slave intelligent controller may contain another radio that is separately programmable from the radio in the master intelligent controller. Similarly, the slave intelligent controller may have an alarm clock that is separately programmable from the alarm clock in the master intelligent controller. In another embodiment, the intelligent controller 102 does not have a display 218 or plurality of button 306, rather the intelligent controller 102 relays the information to be displayed to all the displays on the slave intelligent controller and receives input from the plurality of button on the slave intelligent controllers.

Configuration Web Pages

A remote computer may function as the device capable of displaying a user interface 112. The remote computer is likely a general-purpose computer system such as an IBM compatible, Apple, or other equivalent computer (using a processor that may selectively be an Intel, AMD, Cyrix, Motorola 68XXX or PowerPC series, Compaq Digital Alpha, Sun, HP, IBM, Silicon Graphics, or other type of equivalent processor) that, among other functions, allow a user to communicate with server 104 via a external network, such as the PSTN network. The network is any network that allows multiple computer systems to communicate with each other such as a Local Area Network (LAN), Storage Area Network (SAN), Wide Area Network (WAN) alternative Intranet, Extranet, or the Internet. Server 104 is preferably a general-purpose computer system such as an IBM compatible, Apple, Unix type workstation, or equivalent computer (using a processor that may selectively be an Intel, AMD, Cyrix, Motorola 68XXX or PowerPC series, Compaq Digital Alpha, Sun, HP, IBM, Silicon Graphics, or other type of equivalent processor) that may generate a user interface, responds to commands, and communicates with server 104. Of course, the device 112 and server 104 need not be the same type of general-purpose computer. Both remote computer and server 104 preferably contain a network interface that allows for communication via a network. Network interfaces may selectively include hardware and any software capable of communicating with the network. Examples of the software would be any LAN, WAN, SAN, alternative Intranet, Ethernet capable or Internet compatible software program such as Novell, Windows, Unix, Netscape Navigator, Microsoft Internet Explorer, Mosaic, UP.BROWSER, or similar. It should also be noted that the network could comprise the public telephone network with server 104 acting as a dial-up bulletin board and remote computer dialing in directly to server 104 via the telco network.

Using a remote computer to operably connect to server 104—in a well-known manner dependent upon the technology of network—the user will access the home page of web pages, and thus access to the various functions of the server 104 would be made via hyperlinks. Of course, while the present disclosure is being made in a HTML-type environment, use of this environment is not required as part of the present invention. Other programming languages and user-interface approaches may also be used to facilitate data entry and execute the various computer programs that make up the present invention.

Information may be entered into the user interface for entry into a database 202 residing on the server 104. The information may be input in conjunction with a variety of computer data entry techniques. In some instances, the information may be type-checked (i.e. character, integer, date, etc.), limited by "lookup table" constraints or completely freeform. A user enters a user identifier and the serial number of the intelligent controller 102 into a web page. Upon actuation of the submit button (or similar action), the information entered in the different web pages populates the database entry (not shown) for each user. For new members this process may further involve the creation of a new database record. As a result, server 104 (or another general purpose computer or file server operably associated with server 104) stores the records in the database, the computer programming methods and procedures for which are well-known to those of ordinary skill in the art.

In FIG. 4, an example web page to select radio stations 232 at the web device of FIG. 2 is shown. A user of the device capable of displaying a user interface 112 accesses the server 104 and a user profile associated with the intelligent controller 102. The user supplies information relating to the operating location of the intelligent controller 102 such as a zip code or enters time zone information in a time web page 226 and is then presented with other configuration web pages 224. The server 104 sends a web page 232 to the device 112 for selection of the preset radio stations. In a preferred embodiment, the web page identifies the available radio stations 404 by their frequency 406, call sign 408, city 410, and state 412. The user then selects 414 which of the stations should be pre-selected by placing a check in a box 416 associated with the desired station. The web page may also display the radio stations that have already been selected 418. As would be understood by those familiar with graphical user interface design, the particular placement of elements and user input techniques could be modified in view of this present disclosure without departing from the scope of the invention. Upon completion, the web page is transmitted to the web server 104 for processing and placement of the data into the users profile 204.

Turning to FIG. 5, an example web page to set alarms and radio station 226 at the web device 112 of FIG. 2 is shown. In this preferred approach, the user is shown the day of week 502 and is presented an input field for selected "on time" 504. If the intelligent controller includes a radio, then the alarm may have a wake-up station 506 set to a default "buzz" (i.e. no station) or may be set to one of the radio station presets using a page similar to that of FIG. 4. Further, the user would then activate selected alarms by indicating in an input field 508 that the alarm is to be active. The user is able to review the current alarm settings by viewing the current alarm display 508 that is present on the web page 226. The changes that have just been made by a user may not be reflected in the current alarm display 508 until the alarm schedule is updated. Upon completion, the alarm schedule is updated and the data is transmitted to the web server 104 for processing and placement into the users profile 204.

Figure 6:
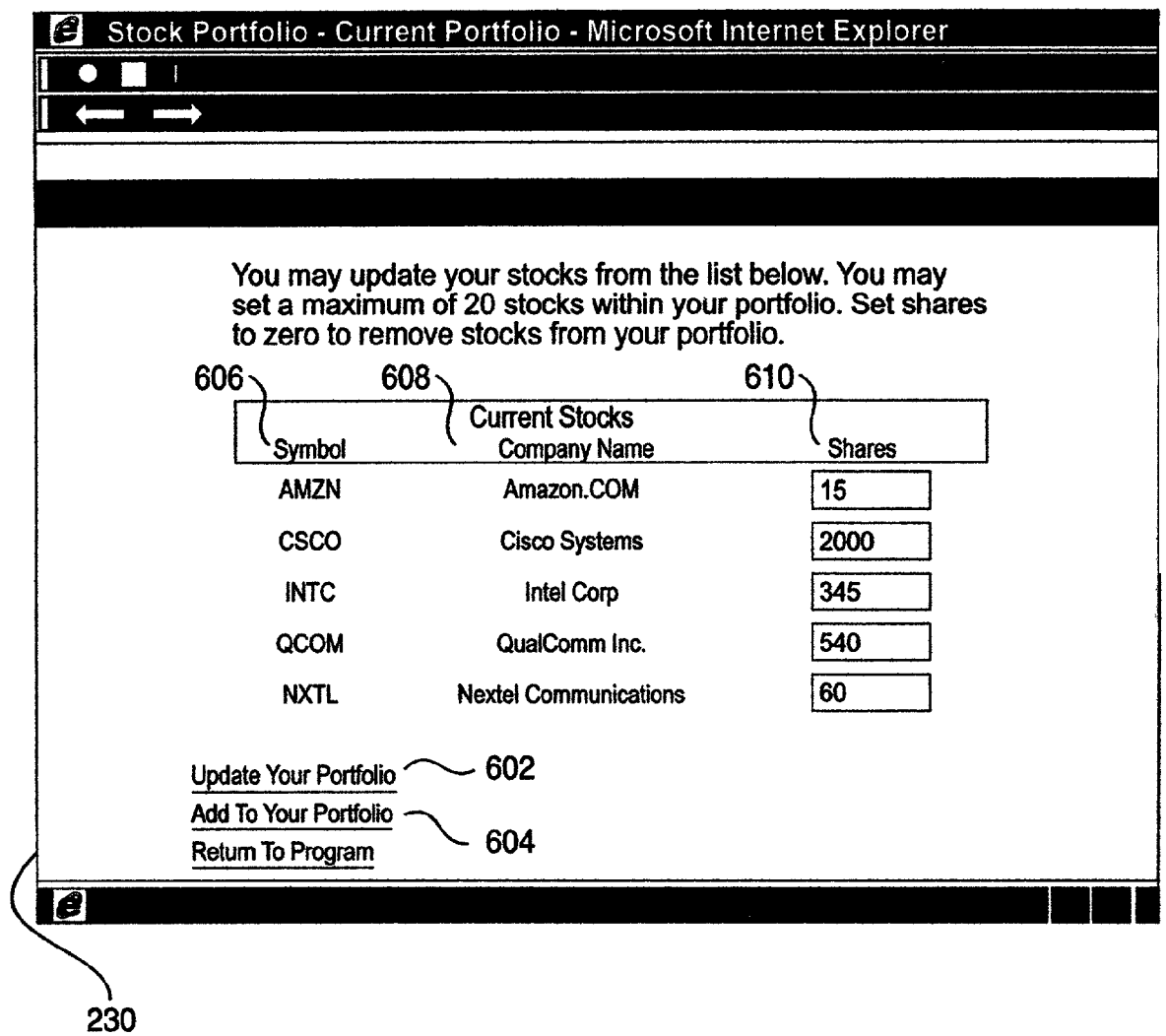
FIG. 6 is a web page to enter current stocks via the device capable of displaying a user interface of FIG. 2.

In FIG. 6, an example web page 230 to enter current stocks 230 at the web device 112 of FIG. 2 is shown. A user may select the web page 230 to select stocks for inclusion in a portfolio tracker. The user is then presented with his current portfolio (initially empty) that includes stock symbols 606, company names 608 and the number of shares 610. The user is also presented with the options of selecting other web pages such as "Update Your Portfolio" 602 or "Add to Your Portfolio" 604. "Updating Your Portfolio" 602 enables a user to access a web page with input boxes for the number of shares. "Add to Your Portfolio" 604 accesses a web page for adding or deleting stocks from the portfolio. Upon completion, the data from web page 230 is transmitted to the web server 104 for processing and placement into the users profile 204.

Figure 7:
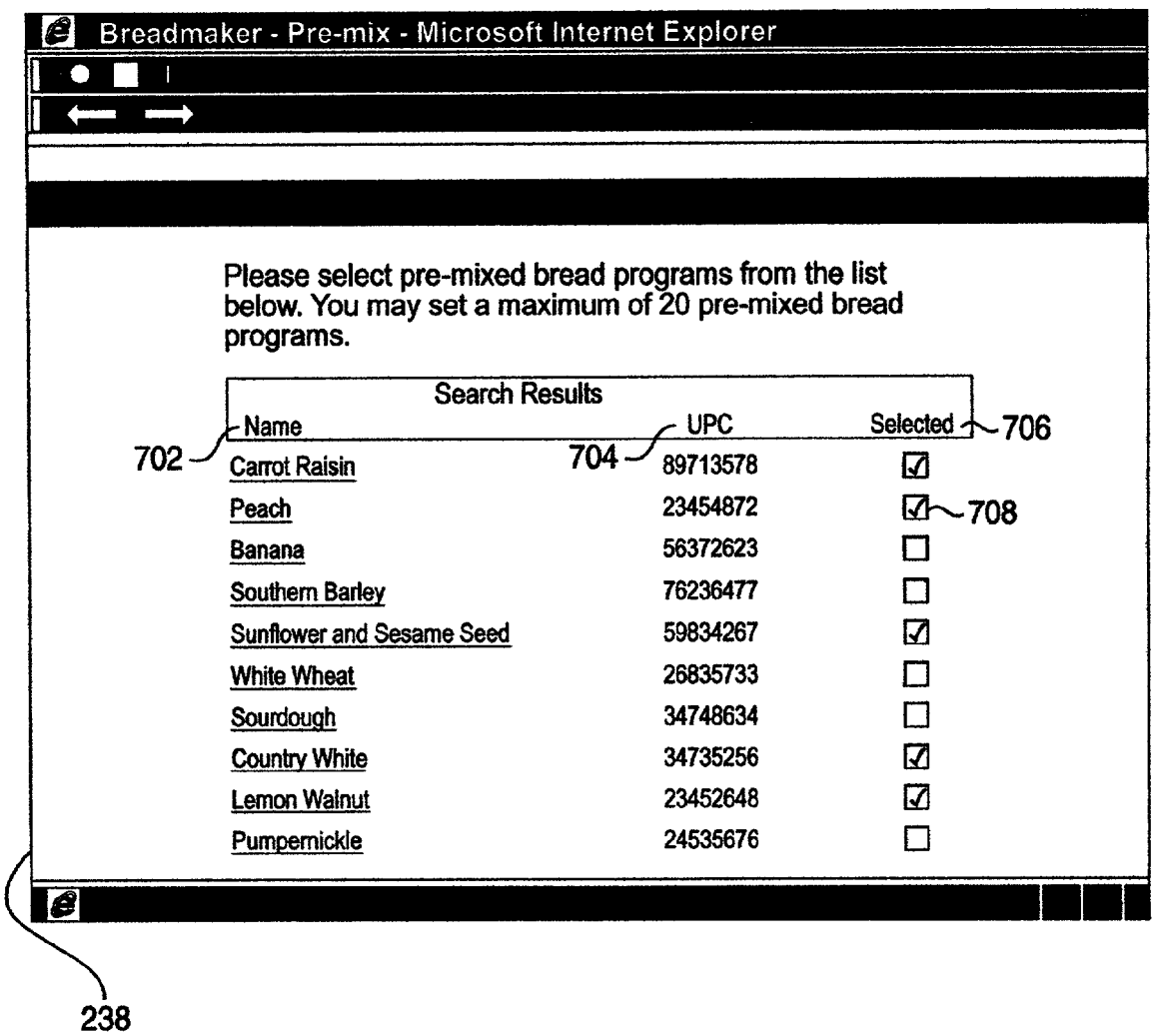
FIG. 7 is a web page to select pre-mix breadmaker recipe programs via the device capable of displaying a user interface of FIG. 2.

Turning to FIG. 7 an example web page 238 to select pre-mix breadmaker recipe programs at the device 112 of FIG. 2 is shown. The page may be made inaccessible to users who have not purchased an intelligent breadmaker 118. A user accesses the web page 238 from the web server 104 and selects the pre-mixed bread recipe programs that user desires to have downloaded to the breadmaker 118. Of course, it should be understood that the recipe programs shown are by way of example and not intended to limit the invention. The name of the pre-mixed bread 702 is displayed along with an associated unique product codes, such as UPC 704. The user selects a pre-mixed bread recipe program 706 by placing a mark in an input box 708. The memory limitation of the breadmaker is reflected by the number of pre-mix bread recipe programs that may be selected and ultimately downloaded, twenty in the present example. In an alternate embodiment, more recipes may be downloaded if more memory is available or if compression techniques are used. In yet other embodiments, the selection of recipe programs occurs over time automatically with a predetermined number of the most recent used recipe programs being selected. The current selected pre-mix bread recipe programs will be displayed on web page 238 with checks in the selection input field 706. Upon completion, the web page 238 is transmitted to the web server 104 for processing and placement of the data into the user's user profile 204.

In FIG. 8, an example web page 236 to select oven recipe programs at the web device 112 of FIG. 2 is shown. The page may be made inaccessible to users who have not purchased an intelligent oven. A user accesses the web page 236 from the web server 104 and selects the oven recipe programs that the user desires to have downloaded to the oven. The names of the oven recipe programs 802 are displayed along with an associated UPC 804. The user selects a oven recipe program 806 by placing a mark in an input box 808. The memory limitation of the oven is reflected by the number of oven recipe programs that may be selected and downloaded, 20 recipe programs in the present example. In an alternate embodiment, more recipe programs may be downloaded if more memory is available or if compression techniques are used. In yet other embodiments, the selection of recipe programs occurs over time with a predetermined number of the most recent recipe programs being selected. The current selected oven recipe programs will be displayed on the web page 236 with checks in the selection input field 806. Upon completion, the data from web page 236 is transmitted to the web server 104 for processing and placement into the users profile 204.

Figure 9:
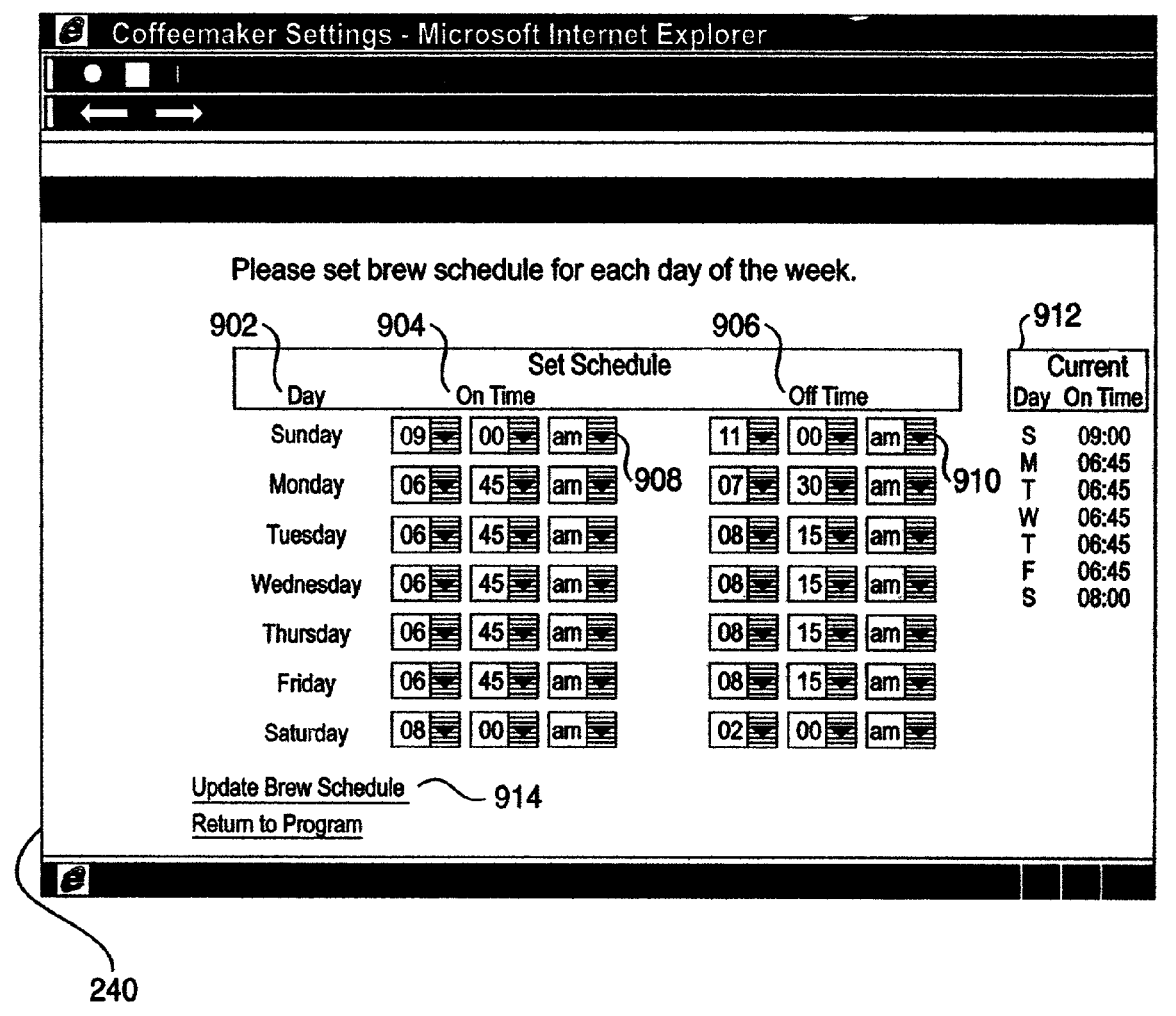

Turning to FIG. 9, an example web page 240 to configure the coffeemaker settings at the web device 112 of FIG. 2 is shown. The page may be made inaccessible to users who have not purchased an intelligent coffeemaker. Upon accessing the web page 240 to configure the coffeemaker settings, the user is presented with a schedule for each day of the week 902. The user is shown the current "On Time" 904 and "Off Time" 906. The user is able to change the "On Time" 904 or "Off Time" 906 by accessing the appropriate input box 908 and 910 for example. The user is also shown the current brew schedule 912 for the coffeemaker. The brew schedule is updated by selection "Update Brew Schedule" 914 and the data is updated in the user profile 204 located in the database 202 located at the web server 104. Although the example of FIG. 9 shows only one setting per day of the week, it is contemplated that any or all days could have a plurality of "On Times" and "Off Times".

In FIG. 10, an example web page 242 to select microwave recipe programs at the web device 112 of FIG. 2 is shown. The page may be made inaccessible to users who have not purchased an intelligent microwave oven. A user accesses the web page 242 from the web server 104 and selects the microwave oven recipe programs to be downloaded to the oven. The name of the microwave oven recipe program 1002 is displayed along with an associated with a unique product code, such as UPC 1004. The user selects a microwave oven recipe program 1006 by placing a mark in an input box 1008. The memory limitation of the microwave oven is reflected by the number of microwave oven recipe programs that may be selected and downloaded, twenty in the present example. In an alternate embodiment, more recipe programs may be downloaded if more memory is available or if compression techniques are used. In yet other embodiments, the selection of recipes occurs over time with a predetermined number of the most recent used recipe programs being selected. The current selected oven recipe programs will be displayed on the web page 236 with checks in the selection input field 1006. Upon completion, the data from web page 242 is transmitted to the web server 104 for processing and placement into the users profile 204.

Coffeemaker

Figure 11:
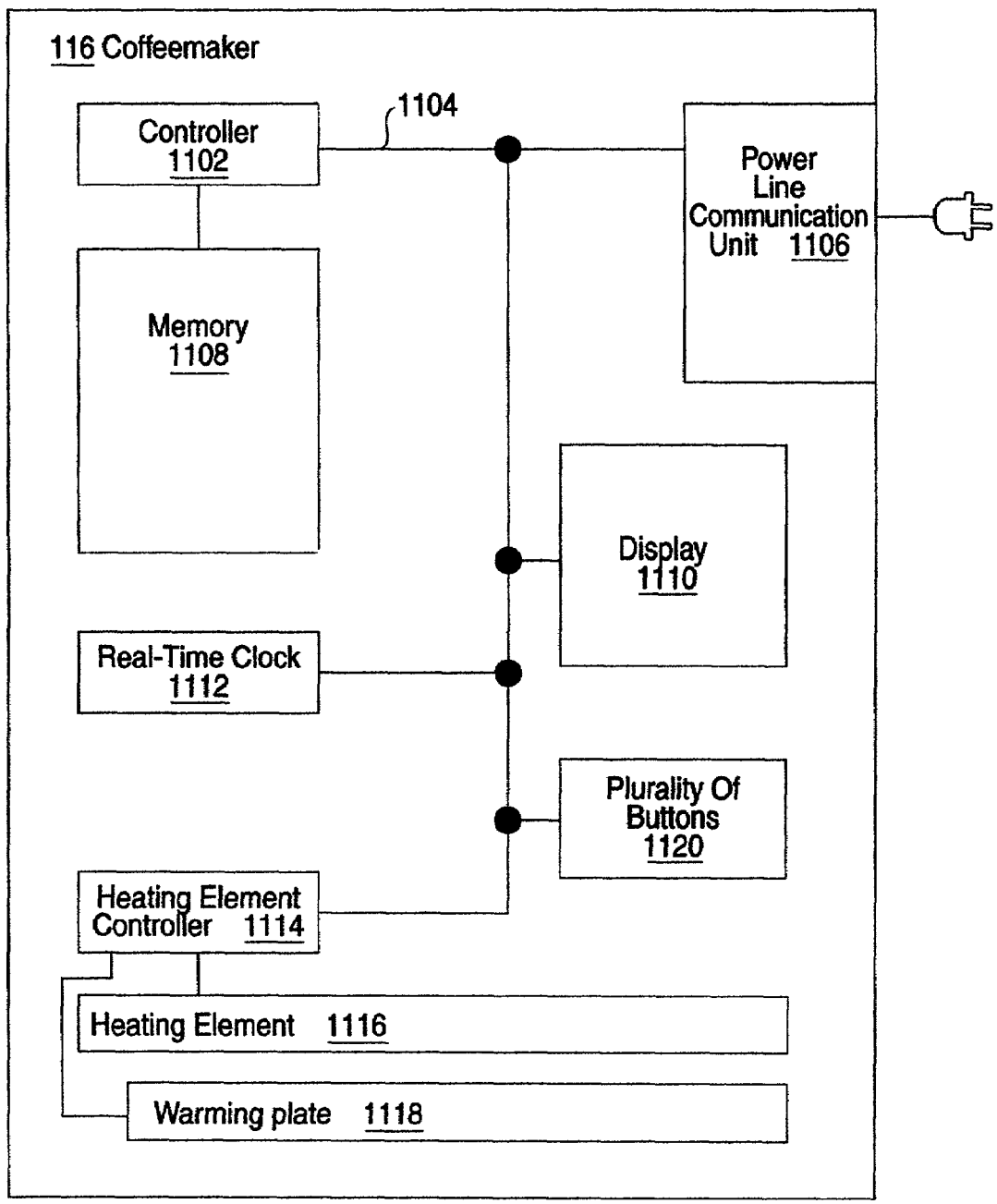
FIG. 11 is a block diagram of the coffeemaker with a local network communication unit of FIG. 1.

FIG. 11 is a block diagram of the coffeemaker 116 (also shown in FIG. 1) with a local network communication link 1106 of FIG. 1. In the preferred embodiment, 1106 is a power line communication unit. The coffeemaker 116 includes a controller 1102 that is operably connected to a bus 1104 that enables communication with a local network communication unit 1106, memory 1108, display 1110, a real-time clock 1112, and a heating element controller 1114. The heating element controller 1114 is able to electrically control the heating element 1116 and warming plate 1118. A plurality of buttons 1120, may also be present and in communication with the controller 1102 to enable manual configuration/operation of the coffeemaker 116.

The controller 1102 is a preferably a microprocessor. In an alternate embodiment controller 1102 may be a reduced instruction set chip (RISC) processor, micro-controller, digital circuits functioning as a controller, analog circuits functioning as a controller, a combination of analog and digital circuits functioning as a controller, or a digital signal processor.

The display 1110 is a light emitting diode display and is able to display numbers (time) and human perceptible indicators such as graphics, text, light emitting diodes, light bulbs, audio signal, or even mechanical signal (i.e. flags or arms that are raised and lowered). The indicators indicate among other possibilities when the coffeemaker 116 is on, programmed, ready to brew, brewing, and coffee ready. In an alternate embodiment, the display 1110 may be a liquid crystal non-color display. In yet another alternate embodiment, a high-resolution display may be used. Further, a color display may be used in yet another embodiment. The display may even be a touch screen display that combines the plurality of buttons 1120 with display 1110 in an additional embodiment.

The local network communication unit 1106 is a unit that transmits a carrier signal that is capable of transporting data between devices over the traditional home AC wiring that electrical appliances receive power from. Thus, the local network communication unit 1106 is shown as both a power supply for the coffeemaker 116 and a communication unit that enables two-way communication with the intelligent controller 102 that share the AC wiring. Examples of such power line communication approaches include; X-10, CEBUS, and POWERBUS by Domosys Corp. Of course, other local network interfaces could alternatively be substituted, such as wireless, cellular and telephone line network interface.

The memory 1108 is preferably a combination of random access memory (RAM), such as dynamic random access memory (DRAMs), synchronous dynamic random access memory (SDRAMs), or other types of read/write memory, and of read only memory (ROM), such as programmable read only memory (PROM), electrically erasable programmable read only memory (EEPROM). In an alternate embodiment, the memory may include external semi-permanent memory, such as magnetic disk (hard disk, removable hard disk, floppy disk), optical disk (CD-RW) or external permanent memory (CD-R and DVD-R). The memory is 1108 is divided into a program portion that controls the operation of the coffeemaker 116 and a data portion that maintains configuration data and variables used and manipulated by the controller 1102 upon execution of a program.

In manual operation, the user may set the real-time clock 1112 of the coffeemaker via the plurality of buttons 1120. The coffeemaker may be turned on or off by one of the plurality of buttons 1120. Once turned on, controller 1102 in the coffeemaker 116 will instruct the heating element controller 1114 to automatically turn off the heating elements after a short period of time (after coffee is made). After two hours, the controller 1102 will automatically instruct the heating element controller 1114 to turn off the warming plate 1118. The controller 1102 is aware of elapsed time by setting timers in the real-time clock 1112.

The coffeemaker 116 may also alternatively be configured from the intelligent controller 102 and web device 104. The intelligent controller 102 detects the presence of coffeemaker 116 when the coffeemaker 116 broadcasts a message via the local network communication unit 1106 upon the coffeemaker 116 being energized (plugged-in to the outlet 124). In an alternate embodiment, the intelligent controller 102 periodically checks for new appliances, by broadcasting a message to all appliances connected either to the power line network or by periodically searching for specific types of appliances, such as coffeemaker 116. In yet another embodiment, registration occurs at a web page displayed on the web device 104 that enables the user to enter information into a user profile 204, such as selecting an input box associated with the coffeemaker or a serial number, that is downloaded to the intelligent controller 102.

In one potential embodiment, the controller 1102 communicating with the intelligent controller 102 via local network communication unit 1106, results in an indicator appearing in the display 1110 to show network communication has been established. The indicator may occur after a time message has been received by the controller 1102 and real-time clock 1112 has been set. The indicator will stay lit for a predetermined indicator time even if communication with the intelligent controller 102 is lost. After that predetermined indicator time, the "network link established" indicator will be deactivated and no longer visible on the display 1110. In an alternate embodiment, the indicator will be deactivated upon the controller 1102 losing communication via the local network communication unit 1106 with the intelligent controller.

The controller 1102 in the coffeemaker 116 may periodically receive time messages from the intelligent controller 102 over the local communication network that results in the controller 1102 setting the real-time clock 1112. In an alternate embodiment, the controller 1102 receives a specific time message that is transmitted only to the coffeemaker 116. In yet another embodiment, the controller 1102 requests a time message from the intelligent controller via the local network communication unit 1106 when power is initially applied to the coffeemaker 116 or restored after a power outage.

The controller 1102 receives programming information from the intelligent controller 102 via the local network communication unit 1106. The intelligent controller in turn has obtained the information from the user profile data entered on the coffeemaker web page 240. The programming of the coffeemaker 116 is by day of week, but in an alternate embodiment may be configurable for multiple time events (multiple times a day, just not once a day). When the coffeemaker 116 is programmed to turn on, the controller 1102 preferably stores the information in memory and sets an event to trigger in the real-time clock 1112. Because this is local to the coffeemaker, once set even if network connection is lost, the coffeemaker 116 can go on. The display 1110 activates a timer indicator to show the coffeemaker 116 has been programmed. At each programmed day and time, the controller 1102 is notified of the event by real-time clock 1112 and notifies the heating element controller 1114 to turn on the heating element 1116 and warming plate 1118. After a preset time, the heating element controller 1114 turns off the heating element 1116 and the coffee is kept hot by the warming plate 1118. During the coffee making operation, the controller 1102 activates an "on" indicator in display 1110. When the heating element controller 1114 turns off the heating element 1116, the controller activates a "ready" display on display 1110.

Preferably, the controller 1102 sends messages via the local network communication unit 1106 to the intelligent controller 102 when the state of the coffeemaker 116 changes. When the coffeemaker 116 is programmed with times for turning on, the controller 1102 may send a message indicating that the coffeemaker is not ready to brew to the intelligent controller 102. A user prepares the coffeemaker 116 by placing water and coffee grounds in the coffeemaker 116 and by pressing one of the plurality of buttons 1120 to activate the coffeemaker 116. The controller 1102 may send a message to the intelligent controller that the coffeemaker 116 has been activated. When the programmed time occurs, the coffeemaker 116 is turned on and the coffee starts to brew. The controller 1102 then sends a message to the intelligent controller 102 signifying that the coffee is brewing. When brewing is complete, the controller 1102 notifies the intelligent controller 102 by sending a message via the local network communication unit 1106.

After the predetermined hold time (generally two hours) about two hours, the heating element controller 1114 is notified over bus 1104 by the controller 1102 to turn off (auto off) the warming plate 1118. The controller 1102 also deactivates the "on" indicator and the "ready" indicator in display 1110. The controller 1102 also send a message to the intelligent controller 102 to inform the intelligent controller 102 that the coffeemaker 116 is again in the not ready to brew. In an alternate embodiment, the period of time for auto off may be set at a web page and stored in the user profile 204 for downloading to the coffeemaker 116 via the intelligent controller 102.

Breadmaker

Figure 12:
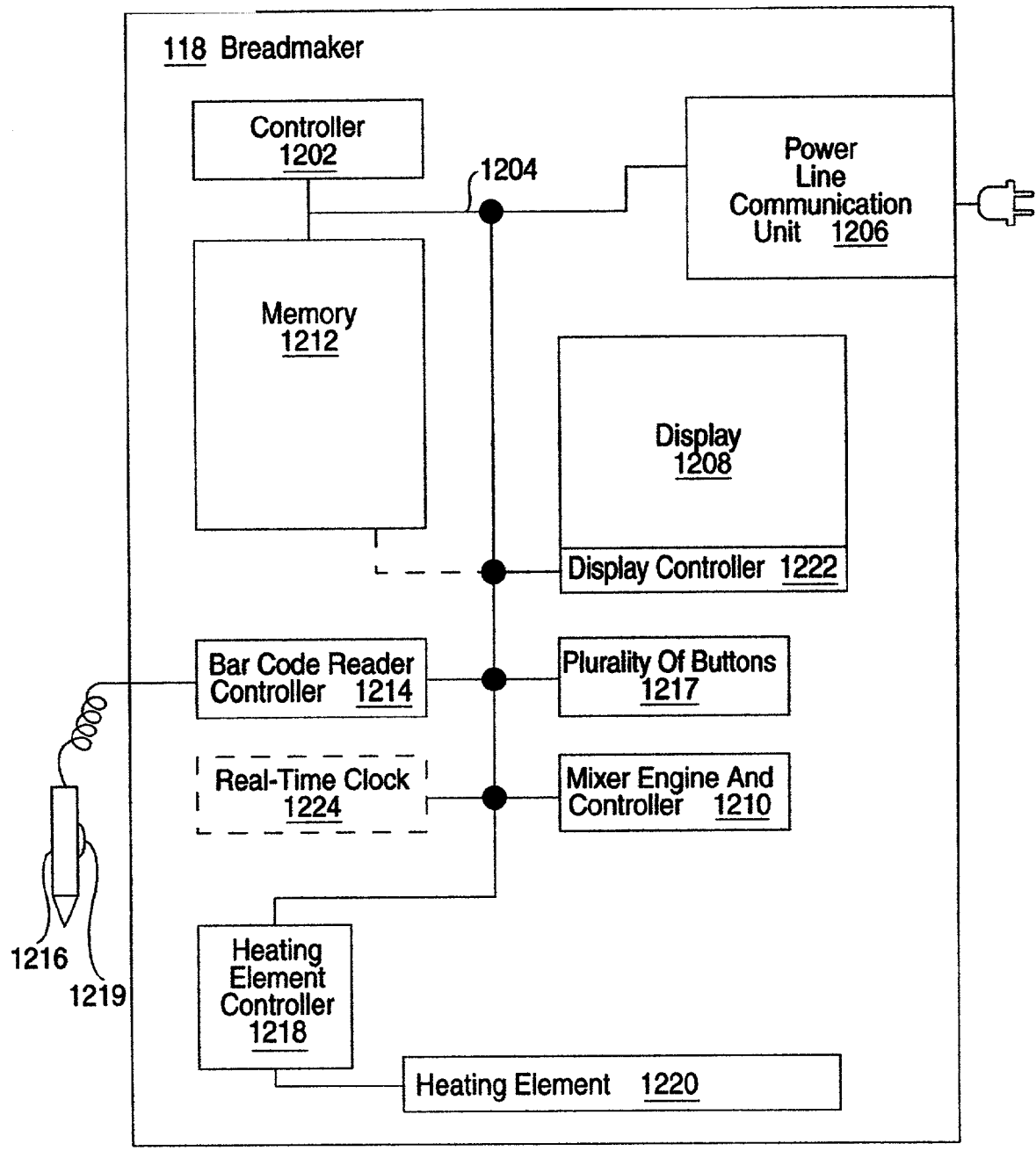
FIG. 12 is a block diagram of the breadmaker with a local network communication link of FIG. 1.

Examining FIG. 12, a block diagram of the breadmaker 118 with a local network communication link 1206 of FIG. 1 is shown. Local network communication unit 1206 is preferably a power line communication unit. A controller 1202 is operably connected by a bus 204 with the power line communication unit 1206, display 1208, mixer engine and controller 1210, memory 1212, an optional product input device such as a bar code reader controller 1214 having a bar code reader 1216, plurality of buttons 1217 and heating element controller 1218. The heating element controller 1218 is connected to heating element 1220 and controls the cycling of the heating element and heat applied to baking dough. The display 1208 is controlled by a display controller 1222 and converts the messages received from the controller 1202 into human perceptible graphics, such as symbols and letters to form words.

The controller 1202 is preferably a microprocessor. In an alternate embodiment, controller 1202 may be a reduced instruction set chip (RISC) processor, micro-controller, digital circuits functioning as a controller, analog circuits functioning as a controller, a combination of analog and digital circuits functioning as a controller, or a digital signal processor.

The display 1208 may be preferably able to display text and low-resolution graphics. The display is controlled by a display controller 1222 that is in communication with memory 1212 and controller 1202. The display 1208 is a liquid crystal non-color display. In an alternate embodiment, a high-resolution display may be used. Further, a color display may be used in yet another embodiment. Even through a LCD display has been used with the preferred embodiment, any other types of displays that are capable of displaying data may be used, including cathode ray tubes and plasma displays. The display may even be a touch screen that combines the plurality of buttons 1217 with display 1208.

The power line communication unit 1206 is a unit that transmits a carrier signal that is capable of transporting data between devices over the traditional home AC wiring that electrical appliances receive power from. Thus, the power line communication unit 1206 is shown as both a power supply for the breadmaker 118 and a communication unit that enables two-way communication with the intelligent controller 102 that share the AC wiring. Examples of such power line communication approaches include; X-10, CEBUS, and POWERBUS by Domosys Corp. Of course other local network interfaces could alternatively be used.

The local network communication unit 1206 enables two-way communication from an appliance to another device and the exchange of data including recipe programs and time synchronization messages. The two-way communication preferably does not occur over a continuous communication path, rather communication occurs between the appliance and the intelligent controller 102 and then between the intelligent controller 102 and the server 104. Similarly, communication may occur between the server 104 and the intelligent controller 102, and then between the intelligent controller 102 and appliances. In alternate embodiments, a communication may be established between the appliance and the server 104 through the intelligent controller 102.

The memory 1212 is a combination of random access memory (RAM), such as dynamic random access memory (DRAM), synchronous dynamic random access memory (SDRAM), or other types of read/write memory, and of read only memory (ROM), such as programmable read only memory (PROM), electrically erasable programmable read only memory (EEPROM). In an alternate embodiment, the memory may include external semi-permanent memory, such as magnetic disk (hard disk, removable hard disk, floppy disk), optical disk (CD-RW) or external permanent memory (CD-R and DVD-R). The memory is 1212 is divided into a program portion that controls the operation of the breadmaker 118 and a data portion that maintains configuration data and variables used and manipulated by the controller 1202 upon execution of a program.

In manual operation, the user may set select the bread type and crust darkness using the plurality of buttons 1217. The breadmaker may be turned on or off by one of the plurality of buttons 1217. Once turned on, controller 1202 in the breadmaker 118 executes a default breadmaking recipe program in memory 1212 that instructs the mixer engine and controller 1210 heating element controller 1218 to start the bread making process that finishes upon the executed default breadmaking program ending.

The breadmaker may alternatively be configured from the intelligent controller 102 and device 104. The intelligent controller 102 detects the presence of breadmaker 118 when the breadmaker 118 broadcasts a message via the power line communication unit 1206 upon being plugged-in to the outlet 126. In an alternate embodiment, the intelligent controller 102 periodically checks for new appliances, by broadcasting a message to all appliances connected either to the power line network or by periodically searching for specific types of appliances, such as breadmaker 118. In yet another embodiment, registration occurs at a web page displayed on the web device 104 that enables the user to enter information into a user profile 204, such as selecting an input box associated with the breadmaker 118 or a serial number, that is downloaded to the intelligent controller 102. The breadmaker 118 may also provide some indication of network connection.

The registered breadmaker 118 receives bread making recipe programs from the intelligent controller 102 via the local network communication unit. The intelligent controller in turn has obtained the information from the data previously selected via web page 238. Each of the bread making recipe programs contain a set of instructions for the controller 1202 that control the cycles of the breadmaker 118. If no bread making recipe programs are selected, the breadmaker 118 loads default bread making recipe programs from the user profile 204 via the intelligent controller 102. The bread making recipe program from memory 1212 may preferably be selected by scanning a UPC symbol on a pre-mix bread making package using bar code reader 1216. In one preferred embodiment, the bar code reader 1216 is shaped like a pen and activates by pressing button 1219. An audible signal is generated upon the successful scanning of a unique product code, such as a UPC symbol when button 1219 is activated.

The bar code reader controller 1214 receives the read UPC symbol from the bar code reader 1216 and converts the bar code symbol into digital data that is read by the controller 1202 over bus 1204. In other embodiments, other types of input may be used for identifying a unique product code, including punch cards, magnetic encoded information (e.g. magnetic strips), keypad entry or other manual entry. The controller 1202 then identifies if one of the bread making recipe program in memory is associated with the digital data received from the bar code reader controller 1214.

Upon identifying the bread making recipe program, the controller 1202 then starts to execute the selected bread making recipe program. Directions for using the pre-mix bread recipe are displayed on display 1208 via display controller 1222. The controller 1202 executing the bread making recipe program initiates each cycle by instructing the mixer engine and controller 1210 along with heating element controller 1218 as to when to turn on and off, and heating temperature (warm to raise dough 90 degrees, hot 350 degrees to bake, and warm 90 degrees to keep bread warm).

During execution of the bread making recipe program, the breadmaker 118 may count down and display the minutes remaining until the bread is done. In this preferred approach, the controller 1202 sets a counter that is decrements to track passing of time. In an alternate embodiment, a real-time clock 1224 may be in communication with controller 1202. The real-time clock 1224 receives time messages from the information controller 102, periodically. The real-time clock 1224 then synchronizes to the time maintained by the intelligent controller 102. The real-time clock 1224 functions in similar fashion to the real-time clock 1112 in coffeemaker 116.

If a unique product code that was scanned or otherwise entered into the system is not found in memory 1212 by controller 1202, then the display controller 1222 is instructed by the controller 1202 to display "Not in Memory" on display 1208. The user manually selects the bread making recipe program to be used with the pre-mix bread. In an alternate embodiment, a default bread making recipe program is used with the pre-mix bread when the UPC that was scanned is not found in memory 1212. An unknown UPC message is formatted by the controller 1202 containing the unknown UPC a sent via the power line communication unit 1206 to the intelligent controller 102 Upon the next synchronization between the database 202 and the intelligent controller 102, the unknown UPC is sent to the web source 104. If the database 202 has a bread making recipe program associated with the unknown UPC, then the user profile 204 is updated with the bread making recipe program and scheduled for download to the intelligent controller 102 upon next synchronization.

In an alternate embodiment, the receipt of an unknown product code message by the intelligent controller 102 results in an immediate synchronization with the web database 202. If the product code is not be found in the database, then the user profile 204 is updated with the UPC as a continuing request for a predetermined period (i.e. one month with a maximum limit of twenty unique product codes). If the bread making recipe program becomes available during the continuing request predetermined period, then the bread making recipe program sent to the breadmaker 118 via the intelligent controller 102 over the local network.

Microwave Oven

Figure 13:
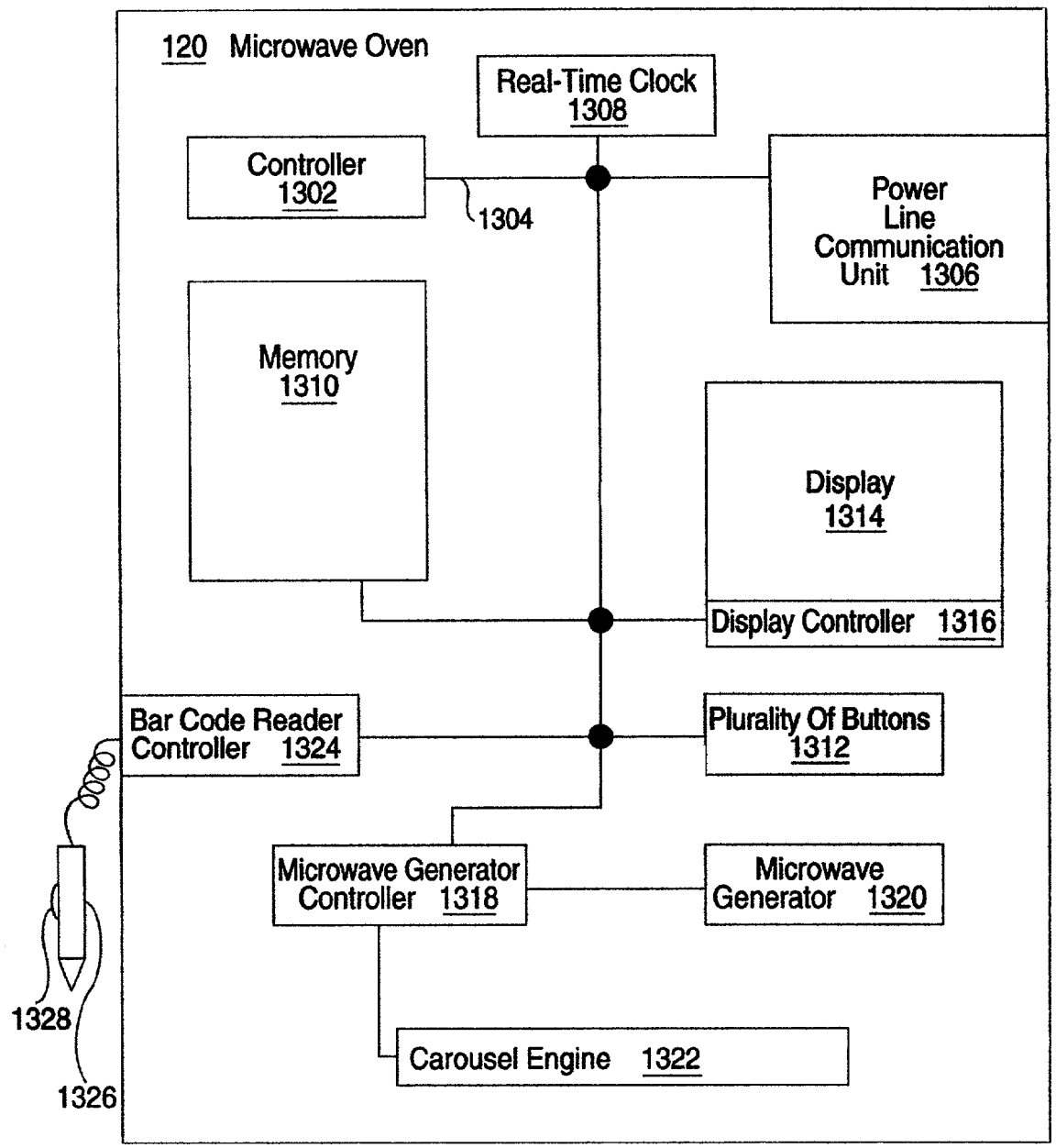
FIG. 13 is a block diagram of the microwave oven with a local network communication link of FIG. 1.

FIG. 13 is a block diagram of the microwave oven 120 with a local network communication unit 1306 of FIG. 1. Local network communication unit 1306 is preferably a power line communication unit. In the microwave oven 120, a controller 1302 is operably connected via a bus 1304 to the power line communication unit 1306, a real-time clock 1308, a memory 1310, a plurality of buttons 1312, a display 1314 via a display controller 1316, a microwave generator controller 1318, and a product code input controller unit, such as a bar code reader controller 1324. Examples of other types of product code inputs include magnetic media, punch cards, and keypads. The microwave generator controller 1318 controls and is coupled to the microwave generator 1320 and a carousel engine 1322.

The controller 1302 is preferably a microprocessor. In an alternate embodiment, controller 1302 may be a reduced instruction set chip (RISC) processor, micro-controller, digital circuits functioning as a controller, analog circuits functioning as a controller, a combination of analog and digital circuits functioning as a controller, or a digital signal processor.

The display 1314 is preferably able to display text and low-resolution graphics. The display is controlled by a display controller 1316 that is in communication with memory 1310 and controller 1302. The display 1314 may be a liquid crystal non-color display. In an alternate embodiment, a high-resolution display may be used. Further, a color display may be used in yet another embodiment. Even through a LCD display has been used with the preferred embodiment, any other types of displays that are capable of displaying data may be used, including cathode ray tubes and plasma displays. The display may even be a touch screen that combines the plurality of buttons 1312 with display 1314.

The power line communication unit 1306 is a unit that transmits a carrier signal that is capable of transporting data between devices over the traditional home AC wiring that electrical appliances receive power from. Thus, the power line communication unit 1306 is shown as both a power supply for the microwave oven 120 and a communication unit that enables two-way communication with the intelligent controller 102 that share the AC wiring. Examples of such power line communication approaches include; X-10, CEBUS, and POWERBUS by Domosys Corp. Of course other local network interfaces could alternatively be used.

The power line communication unit 1306 enables two-way communication from an appliance to another device and the exchange of data including recipe programs and time synchronization messages. The two-way communication preferably does not occur over a continuous communication path, rather communication occurs between the appliance and the intelligent controller 102 and then between the intelligent controller 102 and the server 104. Similarly, communication may occur between the server 104 and the intelligent controller 102, and then between the intelligent controller 102 and appliances. In alternate embodiments, a communication may be established between the appliance and the server 104 through the intelligent controller 102

The memory 1310 is a combination of random access memory (RAM), such as dynamic random access memory (DRAM), synchronous dynamic random access memory (SDRAM), or other types of read/write memory, and of read only memory (ROM), such as programmable read only memory (PROM), electrically erasable programmable read only memory (EEPROM). In an alternate embodiment, the memory may include external semi-permanent memory, such as magnetic disk (hard disk, removable hard disk, floppy disk), optical disk (CD-RW) or external permanent memory (CD-R and DVD-R). The memory 1310 is divided into a program portion that controls the operation of the microwave oven 120 and a data portion that maintains configuration data and variables used and manipulated by the controller 1302 upon execution of a program.

In manual operation, the user may set time and power level or energy setting of the microwave oven 120 using the plurality of buttons 1312. The microwave oven may be turned on or off by one of the plurality of buttons 1312 and will not start until the cooking chamber containing the carousel is closed. Once turned on, controller 1302 in the microwave oven 120 is activated at the set power level for the time period set by the user. The microwave generator controller 1318 start the oven cooking process that finishes upon the expiration of the time period set by the user The microwave generator controller activates the microwave generator 1302 that results in high frequency electromagnetic signals that heat items placed in the cooking chamber. The microwave generator controller 1318 also activates the carousel engine 1322 that is connected to a turntable that rotates items in the cooking chamber and results in a more even distribution of the high frequency electromagnetic signals. Similarly, the real-time clock 1308 that generates the time that is displayed in display 1314 may be manually set using the plurality of buttons 1312.

The microwave oven may alternatively be configured from the intelligent controller 102 and device 104. The intelligent controller 102 detects the presence of microwave oven 120 when the microwave oven 120 broadcasts a message via the power line communication unit 1306 upon being plugged-in to the outlet 128. In an alternate embodiment, the intelligent controller 102 periodically checks for new appliances, by broadcasting a message to all appliances connected either to the power line network or by periodically searching for specific types of appliances, such as microwave oven 120. In yet another embodiment, registration occurs at a web page displayed on the web device 104 that enables the user to enter information into a user profile 204, such as selecting an input box associated with the microwave oven 120 or a serial number, that is downloaded to the intelligent controller 102. The microwave oven may also provide some indication of network connection.

The registered microwave oven 120 receives microwave oven recipe programs from the intelligent controller 102 via the local network communication link. The intelligent controller in turn has obtained the information from the data previously selected via web page 242. If no microwave oven recipe programs are selected, the microwave oven 120 is loaded from defaults microwave oven recipe programs from the user profile 204 via the intelligent controller 102. A microwave oven recipe program from memory 1310 may preferably be selected by scanning a unique product code, such as a UPC symbol on a consumer package (i.e. food container or box) using bar code reader 1326. In one preferred embodiment, the bar code reader 1326 is shaped like a pen and activates by pressing button 1328. An audible signal is generated upon the successful scanning of the unique product code, such as a UPC symbol when button 1326 is activated.

The bar code reader controller 1324 receives the read UPC symbol from the bar code reader 1326 and converts the bar code symbol into digital data that is read by the controller 1302 over bus 1304. The controller 1302 then identifies if one of the bread making recipe program in memory 1310 is associated with the digital data received from the bar code reader controller 1324. In other embodiments, the other types of input reader controllers may be used that control such things as manual inputs, punch card readers, and magnetic media readers, to name but a few.

Upon identifying the microwave oven recipe program, the controller 1302 then execute the microwave oven recipe program. Directions for preparing the consumer item are displayed on display 1314 via display controller 1316, and the power level and cooking time are programmed. The user may also be prompted for serving sizes and to proceed to other steps. The user may respond by using the plurality of buttons 1312 to the different prompts on display 1314. The controller 1302 also instructs the microwave generator controller 1318 as to when to turn on, off (cook time), and power level that will be used to cook the consumer product that scanned.

During execution of a microwave oven recipe program, the microwave oven 120 may count down the remaining minutes until the consumer product is done. In this preferred approach the controller 1302 sets a counter in the real-time clock 1308 and relays time data to the display controller 1316 that is then shown on display 1314. The real-time clock 1308 receives time messages from the information controller 102, periodically. The real-time clock 1308 then synchronizes to the time maintained by the intelligent controller 102. The real-time clock 1308 functions in similar fashion to the real-time clock 1112 in coffeemaker 116.

If a UPC that was scanned is not found in memory 1310 by controller 1402, then the display controller 1316 is instructed by the controller 1302 to display "Not in Memory" on display 1314. The default microwave oven recipe program is then used with the consumer product. An unknown UPC message is formatted by the controller 1302 containing the unknown UPC a sent via the power line communication unit 1306 to the intelligent controller 102. Upon the next synchronization between the database 202 and the intelligent controller 102, the unknown UPC is sent to the web source 104. If the database 202 contains a microwave oven recipe program associated with the unknown UPC, then the user profile 204 is updated with the microwave oven recipe program and scheduled for download to the intelligent controller 102 upon next synchronization.

In an alternate embodiment, the receipt of an unknown UPC message by the intelligent controller 102 results in an immediate synchronization with the web database 202. If the UPC is not be found in the database, then the user profile 204 is updated with the UPC as a continuing request for a predetermined period (i.e. one month with a maximum limit of 20 UPCs). If the microwave oven recipe program becomes available during the continuing request predetermined period, then the microwave oven recipe program is downloaded to microwave oven 120 via the intelligent controller 102.

Oven

Figure 14:
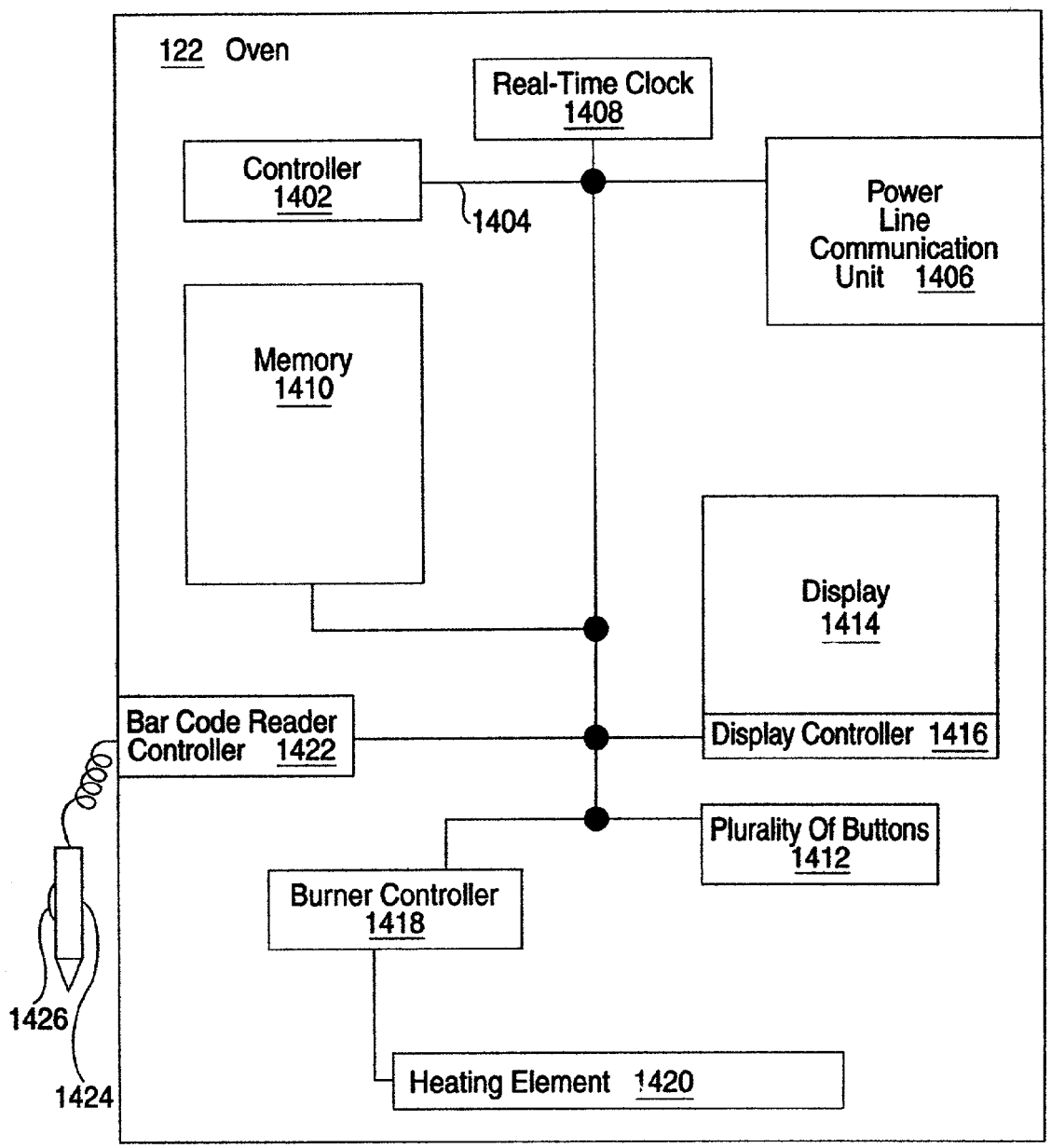
FIG. 14 is a block diagram of the oven with a local network communication link of FIG. 1.

In FIG. 14, a block diagram of the oven 122 with a local network communication unit 1406 of FIG. 1 is shown. Local network communication unit 1406 is preferably a power line communication unit. In the oven 122, a controller 1402 is operably connected via a bus 1404 to the power line communication unit 1406, a real-time clock 1408, a memory 1410, a plurality of controls 1412, a display 1414 via a display controller 1416, a burner controller 1418, and a optional product code input controller, such as a bar code reader controller 1422. Examples of other types of product code input controllers include manual input controllers for accepting entered data, magnetic media reader controllers, punch card reader controllers, to name but a few. The burner controller 1418 the temperature of the oven by controlling the heat generated by a heating element The term oven is used to describe any type of appliance that cooks in an enclosed cavity with heat generated by non-microwave means and include for example gas ovens, electric ovens, convection ovens, or combinations such as an ultravection oven. The heating element may be an electrical heating element or a fossil fuel type burner. The bar code reader 1422 is connected to a bar code reader 1424 having a button 1426 that activates the bar code reader 1422.

The controller 1402 is preferably a microprocessor. In an alternate embodiment, controller 1202 may be a reduced instruction set chip (RISC) processor, micro-controller, digital circuits functioning as a controller, analog circuits functioning as a controller, a combination of analog and digital circuits functioning as a controller, or a digital signal processor.

The display 1414 is preferably able to display text and low-resolution graphics. The display is controlled by a display controller 1416 that is in communication with memory 1410 and controller 1402. The display 1414 may be a liquid crystal non-color display. In an alternate embodiment, a high-resolution display may be used. Further, a color display may be used in yet another embodiment. Even through a LCD display has been used with the preferred embodiment, any other types of displays that are capable of displaying data may be used, including cathode ray tubes and plasma displays. The display may even be a touch screen that combines the plurality of controls 1412 with display 1414.

The power line communication unit 1406 is a unit that transmits a carrier signal that is capable of transporting data between devices over the traditional home AC wiring that electrical appliances receive power from. Thus, the power line communication unit 1406 is shown as both a power supply for the oven 122 and a communication unit that enables two-way communication with the intelligent controller 102 that share the AC wiring. Examples of such power line communication approaches include; X-10, CEBUS, and POWERBUS by Domosys Corp. Of course, other local network interfaces could alternatively be used.

The power line communication unit 1406 enables two-way communication from an appliance to another device and the exchange of data including recipe programs and time synchronization messages. The two-way communication preferably does not occur over a continuous communication path, rather communication occurs between the appliance and the intelligent controller 102 and then between the intelligent controller 102 and the server 104. Similarly, communication may occur between the server 104 and the intelligent controller 102, and then between the intelligent controller 102 and appliances. In alternate embodiments, a communication may be established between the appliance and the server 104 through the intelligent controller 102.

The memory 1410 is a combination of random access memory (RAM), such as dynamic random access memory (DRAM), synchronous dynamic random access memory (SDRAM), or other types of read/write memory, and of read only memory (ROM), such as programmable read only memory (PROM), electrically erasable programmable read only memory (EEPROM). In an alternate embodiment, the memory may include external semi-permanent memory, such as magnetic disk (hard disk, removable hard disk, floppy disk), optical disk (CD-RW) or external permanent memory (CD-R and DVD-R). The memory is 1410 is divided into a program portion that controls the operation of the oven 122 and a data portion that maintains configuration data and variables used and manipulated by the controller 1402 upon execution of a program.

In manual operation, the user selects an energy setting (temperature) of the oven 122 using the plurality of controls 1412. The user may also be able to set a time period for pre-heating the oven and a cooking time period using the plurality of controls 1412. The oven may be turned on by one of the plurality of controls 1412 that selects the energy setting. Once turned on, controller 1402 in oven 122 executes a default oven recipe program in memory 1410 that instructs the burner controller 1418 to start the heating process by activating the heating element 1420. When the oven finishes execution of the default oven recipe program the controller 1402 instructs the burner controller 1418 to deactivate the heating element 1420 or to keep the oven warm by reducing the heat generated by the heating element 1420. The user may also manually set the real-time clock 1404 so time is properly displayed on display 1414 using the plurality of controls 1412.

The oven may alternatively be configured from the intelligent controller 102 and web device 104. The intelligent controller 102 detects the presence of oven 122 when the oven 122 broadcasts a message via the power line communication unit 1406 upon being plugged-in to the outlet 130. The oven 122 also receives timing messages that enable the controller 1420 to set the real-time clock 1408 and display the correct time on display 1414. In an alternate embodiment the intelligent controller 102 periodically checks for new appliances either by broadcasting a message to all appliances connected to the power line network or by periodically searching for specific types of appliances, such as oven 122. In yet another embodiment, registration occurs at a web page displayed on the web device 104 that enables the user to enter information into a user profile 204, such as selecting an input box associated with the oven 122 or a serial number, that is downloaded to the intelligent controller 102. The oven may also provide some indication of network connection.

The registered oven 122 receives oven recipe programs from the intelligent controller 102 via the local network communication link. The intelligent controller in turn has obtained the information from the data previously selected via web page 236 If no oven recipes are selected, the oven 122 is loaded from defaults oven recipes from the user profile 204 via the intelligent controller 102. The oven recipe program from memory 1410 may preferably be selected by scanning a unique product code, such as a UPC symbol on a consumer package (i.e. food container or box) using bar code reader 1424. In one preferred embodiment, the bar code reader 1424 is shaped like a pen and activates by pressing button 1426. An audible signal is generated upon the successful scanning of a UPC symbol when button 1426 is activated.

The bar code reader controller 1422 receives the read UPC symbol from the bar code reader 1424 and converts the bar code symbol into digital data that is read by the controller 1402 over bus 1404. The controller 1402 then identifies if a oven recipe program that is associated with the digital data received from the bar code reader controller 1422. In alternate embodiments, other types of product code reader controllers may be used, such as manual input controllers, punch card controllers, magnetic media reader controllers, to name but a few.

Upon identifying the microwave oven recipe program, the controller 1402 then starts to execute the oven recipe program. Directions for use of the oven recipe program are displayed on display 1414 via display controller 1416. The user may also be prompted for serving sizes and to proceed in the preparation of the scanned consumer product. The user may respond to such by using the plurality of controls 1412. The controller 1402 also instructs the burner controller 1418 as to when to turn on and off, and what temperature is required to cook the consumer product that was previously scanned.

During execution of a program associated with the selected oven recipe program, the oven 122 may count down and display the remaining minutes until the consumer product is done. The controller 1402 sets a counter in the real-time clock 1408 and relays time data to the display controller 1416 that is then shown on display 1414. The real-time clock 1408 receives time messages from the information controller 102, periodically. The real-time clock 1408 then synchronizes to the time maintained by the intelligent controller 102. The real-time clock 1408 functions in similar fashion to the real-time clock 1112 in coffeemaker 116.

If a UPC that was scanned is not found in memory 1410 by controller 1402, then the display controller 1416 is instructed by the controller 1402 to display "Not in Memory" on display 1414. The default oven recipe program is then used with the consumer product or the user is prompted to manual set the oven 122. An unknown unique product code message is formatted by the controller 1402 containing the unknown unique product code, such as a UPC and sent via the power line communication unit 1406 to the intelligent controller 102. Upon the next synchronization between the database 202 and the intelligent controller 102, the unknown UPC is sent to the web source 104. If the database 202 contains a recipe associated with the unknown UPC, then the user profile 204 is updated with the oven recipe program and scheduled for download to the intelligent controller 102 upon next synchronization. In an alternate embodiment, the receipt of an unknown UPC message by the intelligent controller 102 results in an immediate synchronization with the web database 202. If the UPC is not be found in the database, then the user profile 204 is updated with the UPC as a continuing request for a predetermined period (i.e. one month with a maximum limit of 20 UPCs). If the oven recipe program becomes available during the continuing request predetermined period, then the oven recipe program is downloaded to the oven 122 via the intelligent controller 102.

Flow Chart

Figure 15:
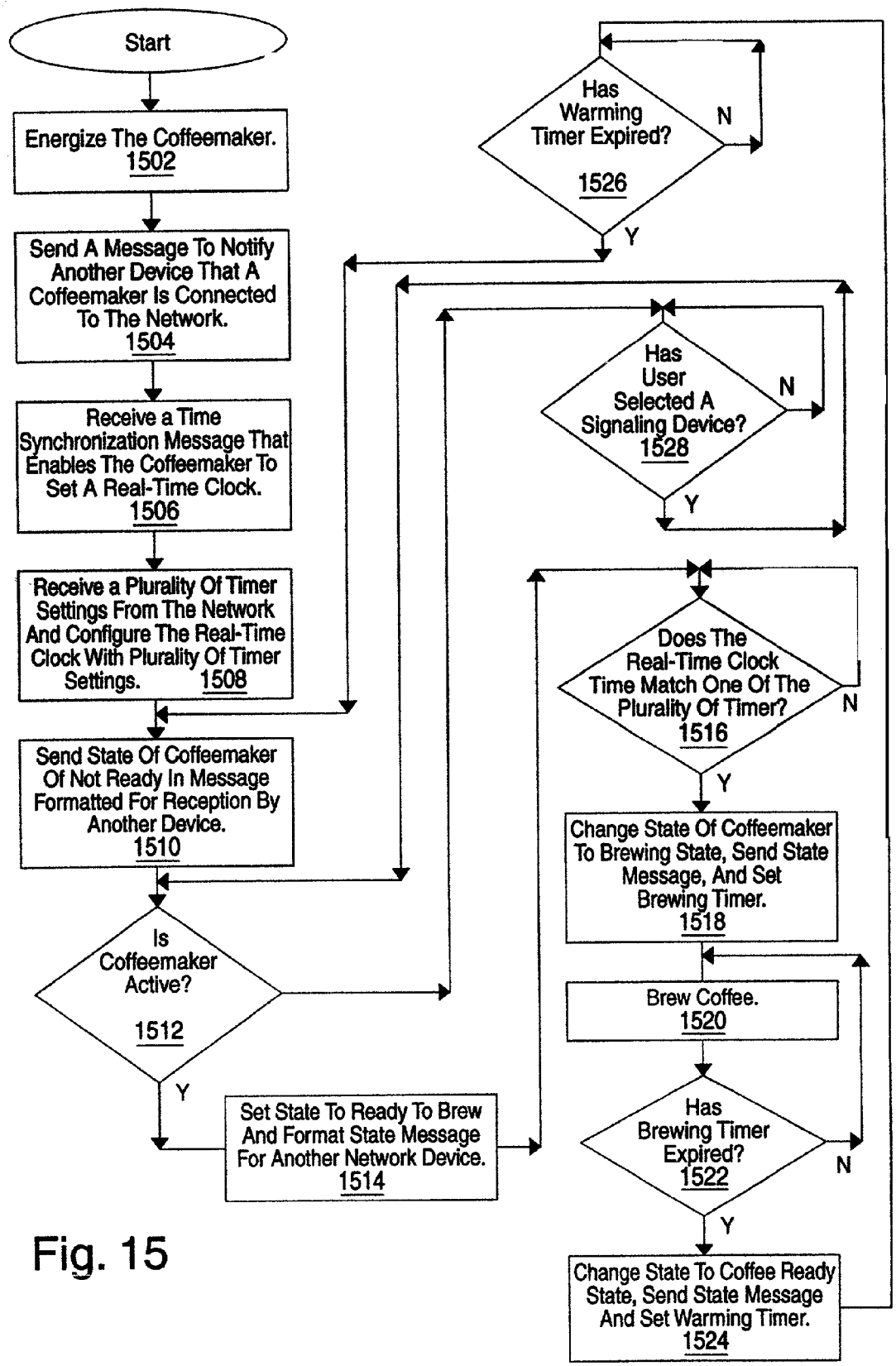
FIG. 15 is a flow chart of an intelligent coffeemaker process in accordance with an embodiment of the invention.

Turning to FIG. 15, a flow chart of an intelligent coffeemaker process is shown. The coffeemaker 116 is a household appliance that is energized (1502) by connecting the coffeemaker 116 to the AC wiring of a home at a wall receptacle 124. The coffeemaker 116 is configured with a communication interface, such as the power line communication unit 1106, that enables bi-direction communication across a home network with other network devices. Upon the coffeemaker 116 being energized (1502), an announcement message is formatted by the controller 1102 and transmitted by the power line communication unit for reception by a device such as intelligent controller 102. The announcement message notifies at least one other device in the home network that the coffeemaker 116 is present and energized.

The coffeemaker 116 may also receive a time synchronization message that enables the real-time clock 1112 in the coffeemaker 116 to be set to a network time (1506). In an alternate embodiment the coffeemaker 116 may set a human perceptible synchronization indicator for a preset time period, such as a light emitting diode (LED), symbol on a display, audio signal, mechanical signal (i.e. a raised flag). If another synchronization message is not received during the preset time period, then the human perceptible synchronization indicator is unset. The synchronization message is periodically received at the power line communication unit either in response to a request triggered by an event or upon time synchronization message being broadcast to all network devices 116–122 from a master time keeping device.

A plurality of timers controlled by the real-time clock 1112 in coffeemaker 116 are configured remotely, stored in a database 202 and downloaded to the coffeemaker 116 from the intelligent controller 102 upon the coffeemaker being energized. The coffeemaker 116 receives the plurality of timer settings (1508) at power line communication unit 1106 after the coffeemaker 116 has sent its notification message and the controller 1102 configures the real-time clock 1112 with the plurality of timer settings. In an alternate embodiment, the plurality of timer settings may periodically be transmitted in the network with no prior knowledge that a coffeemaker 116 is present. When the controller 1102 in coffeemaker 116 detects a message containing the plurality of timer settings, it processes the message and configures the real-time clock 1112 accordingly.

Upon the plurality of timer settings being received and the real-time clock 1112 configured with the plurality of timer settings (1508), the controller 1102 formats a status message for reception by another network device that reports the coffeemaker 116 is in a "not ready" state (1510). A not ready state is identified as the coffeemaker 116 having a timer set to start the brewing of coffee, but the coffeemaker 116 has not been set up and/or activated. A coffeemaker 116 needs to have water, coffee and a filter in order to brew coffee or at a minimum water if hot water is expected. Because a user must interact with the coffeemaker to prepare it for brewing, a button among the plurality of buttons 1120 is preferably pressed to signal the coffeemaker 116 is ready to brew. Alternatively, one or more sensors may be used to determine if the coffeemaker is ready. Upon pressing the button among the plurality of buttons 1120, the coffeemaker 116 is in an active or sometimes called the ready to brew state.

If the coffeemaker 116 is in the active (ready to brew) state (1512), then the controller 1102 formats a state change message for reception by another network device such as an intelligent controller 102 informing the other network device that the coffeemaker is in the active state and ready to brew. The power line communication unit 1106 send the state change message via the home network to the other network device (1514).

The real-time clock 1112 keeps track of time and the plurality of timer settings. If none of the timer settings is equal to the real-time clock 1112 time (1516), then another check of the plurality of timer settings and the real-time clock time (1516) is conducted. When each of the timer settings is equal to the real-time clock 1112 time (1516), then the state of the coffeemaker 116 is changed to a brewing state, a brewing timer may be set and a state message informing another network device of the brewing state of the coffeemaker 116 is formatted (1518). The state message sent by the power line communication unit 1106 across the home network. The coffee is brewed (1520) while the brewing timer is active. It is possible for other liquids such as tea and hot water to be brewed other than coffee.

The expiration of the brew timer is periodically checked (1522) and if not expired, brewing continues (1520). Upon the brew timer being expired (1522), the state of the coffeemaker is changed to a ready state, a warming timer is set for one hour and a state message formatted for reception by another network device such as an intelligent controller (1524). The warming timer is used to in order to have the heating element controller 1114 turn off the warming plate 1118 after an hour.

The warming timer is periodically checked (1526) to determine if the warming timer has expired. If the warming timer has expired, then the warming plate 1118 is turned off and the state of the coffeemaker 116 is changed to not ready. The state message is formatted and sent across the in home network for reception by another device (1510).

If the coffeemaker 116 is not in the active or "ready to brew" state (1512) then processing is delayed until the user places the coffeemaker 116 into the "ready to brew" state by activating a signaling device such as a button among the plurality of buttons 1120 or changing a position of a switch. A check for the activation of the signaling device occurs (1128) and if no activation has occurred, then another check (1128) occurs. Upon the activation, the coffeemaker 116 changes state to "ready to brew" and formats a state message containing the "ready to brew" state for another network device (1514).

It is appreciated by those skilled in the art that the process shown in FIG. 15 may selectively be implemented in hardware, software, or a combination of hardware and software. An embodiment of the process steps employs at least one machine-readable signal bearing medium. Examples of machine-readable signal bearing mediums include computer-readable mediums such as a magnetic storage medium (i.e. floppy disks, or optical storage such as compact disk (CD) or digital video disk (DVD)), a biological storage medium, or an atomic storage medium, a discrete logic circuit(s) having logic gates for implementing logic functions upon data signals, an application specific integrated circuit having appropriate logic gates, a programmable gate array(s) (PGA), a field programmable gate array (FPGA), a random access memory device (RAM), read only memory device (ROM), electronic programmable random access memory (EPROM), or equivalent. Note that the computer-readable medium could even be paper or another suitable medium, upon which the computer instruction is printed, as the program can be electronically captured, via for instance optical scanning of the paper or other medium, then compiled, interpreted or otherwise processed in a suitable manner if necessary, and then stored in a computer memory.

Additionally, machine-readable signal bearing medium includes computer-readable signal bearing mediums. Computer-readable signal bearing mediums have a modulated carrier signal transmitted over one or more wire based, wireless or fiber optic networks or within a system. For example, one or more wire based, wireless or fiber optic network, such as the telephone network, a local area network, the Internet, or a wireless network having a component of a computer-readable signal residing or passing through the network. The computer readable signal is a representation of one or more machine instructions written in or implemented with any number of programming languages.

Furthermore, the multiple process steps implemented with a programming language, which comprises an ordered listing of executable instructions for implementing logical functions, can be embodied in any machine-readable signal bearing medium for use by or in connection with an instruction execution system, apparatus, or device, such as a computer-based system, controller-containing system having a processor, microprocessor, digital signal processor, discrete logic circuit functioning as a controller, or other system that can fetch the instructions from the instruction execution system, apparatus, or device and execute the instructions.

While various embodiments of the application have been described, it will be apparent to those of ordinary skill in the art that many more embodiments and implementations are possible that are within the scope of this invention. Accordingly, the invention is not to be restricted except in light of the attached claims and their equivalents.

I claim:

1. An apparatus, comprising:
   a coffeemaker;
   a clock with a plurality of timers;
   a controller with a communication path to the clock; and
   a network interface connected to the communication path in receipt of a plurality of timer settings that are set in the clock by the controller that controls the coffeemaker;
   wherein the controller is configured to form a message containing a state of the coffeemaker apparatus, and the network interface transmits the state message from the network interface for reception by another device.

2. The apparatus of claim 1, wherein the state of the coffeemaker is a not ready state upon the plurality of timer settings being set.

3. The apparatus of claim 2, further comprising:
   a button that when selected results in the state of the coffeemaker being in a ready to brew state.

4. The apparatus of claim 3, wherein a brew timer is set upon a time kept by the clock matching one of the plurality of timer settings and results in the state of the coffeemaker apparatus being in a brewing state.

5. The apparatus of claim 4, further comprising:
   a warming plate that is turned off upon the expiration of a warming timer that is set upon the expiration of the brew timer and results in the state of the coffeemaker being a coffee ready state.

6. The apparatus of claim 1, further comprising:
   a memory that stores the plurality of timer settings.

7. The apparatus of claim 1, wherein a time synchronization message having a time that is received by the network interface and results in the clock being set to the time in the time synchronization message.

8. The apparatus of claim 1, further comprising:
   a display in communication with the clock over the communication path that displays a time on the display.

9. The apparatus of claim 1, further comprising:
   a display in communication with the controller over the communication path that displays the state of the coffeemaker.

10. A method, comprising:
    receiving at a coffeemaker apparatus with a network interface at least one timer setting at the network interface;
    setting a clock with the at least one timer setting;
    setting a state of the coffeemaker apparatus;
    formatting a state message containing the state;
    transmitting the state message from the network interface for reception by another device; and;
    controlling the coffeemaker apparatus based on the state of the coffeemaker apparatus.

11. The method of claim 10, wherein setting the state further includes:
    setting the state of the coffeemaker apparatus to a not ready state upon the setting of the clock with the at least one timer settings.

12. The method of claim 10, wherein setting the state further includes:
    signaling from an input device on the coffeemaker apparatus; and
    setting the state of the coffeemaker apparatus to a ready to brew state in response to the signaling of the input device.

13. The method of claim 10, wherein setting the state further includes:
    identifying that the clock has reached the at least one timer settings;
    initializing a brew timer to a predetermined time value; and
    setting the state of the coffeemaker apparatus to a brewing state.

14. The method of claim 13, wherein setting the state further includes:
    identifying that brew timer has expired;
    setting a warming timer in response to the brew timer expiring; and
    changing the state of coffeemaker apparatus to a coffee ready state.

15. The method of claim 14, wherein setting the state further includes:
    identifying that the warming timer has expired; and
    changing the state of the coffeemaker apparatus to a not ready state in response to the expiration of the warming timer.

16. The method of claim 14, further including:
    deactivating a warming plate in response to expiration of the warming timer.

17. The method of claim 10, further comprising:
    displaying on a display a time from the clock.

18. The method of claim 10, further comprising:
    displaying on a display a state of the coffeemaker appliance.

19. The method of claim 10, further comprising:
    receiving a time synchronization message at the network interface of the coffeemaker appliance; and
    setting the clock in response to the time synchronization message.

20. An apparatus, comprising:
    means for receiving at a coffeemaker apparatus at least one timer setting at the network interface;
    means for setting a clock with the at least one timer setting;
    means for setting a state of the coffeemaker apparatus;

means for formatting a state message containing the state for reception by another device;
means for transmitting the state message and;
means for controlling the coffeemaker apparatus based on the state of the coffeemaker apparatus.

21. The apparatus of claim 20, wherein the means for setting the state further includes:
means for setting the state of the coffeemaker apparatus to a not ready state upon the setting of the clock with the at least one timer settings.

22. The apparatus of claim 20, wherein the means for setting the state further includes:
means for signaling from an input device on the coffeemaker apparatus; and
means for setting the state of the coffeemaker apparatus to a ready to brew state in response to the input device.

23. The apparatus of claim 20, wherein the means for setting the state further includes:
means for identifying that the clock has reached the at least one timer settings;
means for initializing a brew timer to a predetermined time value; and
means for setting the state of the coffeemaker apparatus to a brewing state.

24. The apparatus of claim 23, wherein the means for setting the state further includes the steps of:
means for identifying that brew timer has expired;
means for setting a warming timer in response to the brew timer expiring; and
means for changing the state of coffeemaker apparatus to a coffee ready state.

25. The apparatus of claim 24, wherein the means for setting the state further includes the steps of:
means for identifying that the warming timer has expired; and
means for changing the state of the coffeemaker apparatus to a not ready state in response to the expiration of the warming timer.

26. The apparatus of claim 24, further including:
means for deactivating a warming plate in response to expiration of the warming timer.

27. The apparatus of claim 20, further comprising:
means for displaying on a display a time from the clock.

28. The apparatus of claim 20, further comprising:
means for displaying on a display a state of the coffeemaker appliance.

29. The apparatus of claim 20, further comprising:
means for receiving a time synchronization message at the network interface of the coffeemaker appliance; and
means for setting the clock in response to the time synchronization message.

* * * * *